United States Patent
Lubbers et al.

[11] Patent Number: 5,983,637
[45] Date of Patent: Nov. 16, 1999

[54] HYDRAULIC BRAKE BOOSTER HAVING PISTON TRAVEL LIMIT FEATURE

[75] Inventors: Mark D. Lubbers, Ann Arbor; Herbert L. Linkner, Jr., Dexter; Gregory J. Krawczyk, Livonia; Richard J. Barron, Ann Arbor, all of Mich.

[73] Assignee: Kelsey-Hayes Company, Livonia, Mich.

[21] Appl. No.: 08/958,579

[22] Filed: Oct. 28, 1997

Related U.S. Application Data

[60] Provisional application No. 60/028,623, Oct. 28, 1996.

[51] Int. Cl.⁶ ..................................................... B60T 13/20
[52] U.S. Cl. .................................. 60/549; 60/560; 60/578
[58] Field of Search ........................ 91/376 R; 60/597.1, 60/599, 560, 574, 578

[56] References Cited

U.S. PATENT DOCUMENTS

| | | |
|---|---|---|
| 3,937,127 | 2/1976 | Baker et al. |
| 4,135,435 | 1/1979 | Adachi. |
| 4,530,209 | 7/1985 | Steffes. |
| 4,582,365 | 4/1986 | Belart ..................................... 60/578 X |
| 4,621,498 | 11/1986 | Schaefer ................................. 60/578 X |
| 4,732,001 | 3/1988 | Belart ..................................... 60/578 X |
| 4,835,967 | 6/1989 | Nomura. |
| 5,557,935 | 9/1996 | Ganzel ...................................... 60/578 |

OTHER PUBLICATIONS

Article entitled "Hydraulics Offer Advantages In Power Brake Boosters" by A. K. Brown, L. G. Bach and D. J. Baker, published by Society of Automotive Engineers, Article No. 730536. May 1973.

*Primary Examiner*—Hoang Nguyen
*Attorney, Agent, or Firm*—MacMillan, Sobanski & Todd, LLC

[57] ABSTRACT

A brake booster for a brake system of a vehicle, wherein the brake booster is in fluid communication with a source of pressurized fluid. The brake booster includes a housing having a bore formed therein and a conduit formed therein being in fluid communication with the bore and the source of pressurized fluid. The brake booster includes first and second pistons slidably disposed within the bore of the housing. The bore, the first piston, and the second piston define a fluid chamber in fluid communication with the conduit formed in the housing, wherein the volume of the chamber is defined by the position of the first piston relative to the second piston. The brake booster further includes a valve selectively preventing fluid flow in a direction from the chamber to the source of pressurized fluid via the conduit.

10 Claims, 13 Drawing Sheets

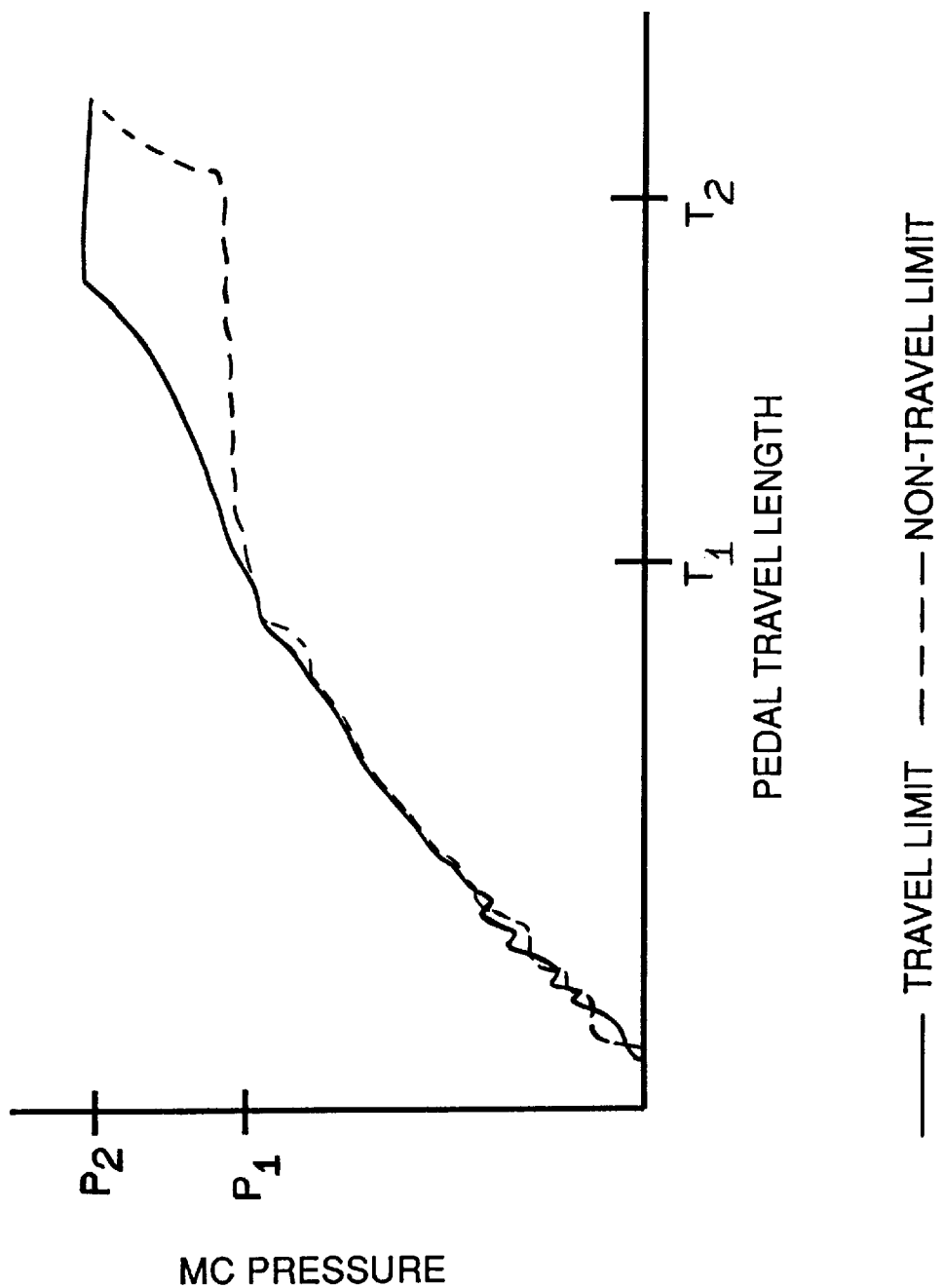

HYDRAULIC BRAKE BOOSTER HAVING PISTON TRAVEL LIMIT FEATURE

CROSS REFERENCE TO RELATED APPLICATIONS

This application claims the benefit of U.S. Provisional Application No. 60/028,623 filed Oct. 28, 1996.

BACKGROUND OF THE INVENTION

This invention relates in general to brake systems for motor vehicles, and in particular to fluid pressure operated brake boosters for vehicle braking systems.

Conventional vehicle braking systems are constructed such that the braking force developed by the system is generally proportional to the force applied by the vehicle operator on a vehicle brake pedal. The pedal is linked to a piston in a master cylinder which moves to pressurize the fluid of the brake system, and thus actuate the individual wheel brakes. Generally, in order to provide a sufficiently high pressure to operate the wheel brakes without requiring an excessive effort by the operator, most vehicles include a "boosted" power brake system wherein the force applied to the brake pedal by the operator is amplified or boosted before being applied to the master cylinder. In automobiles and light trucks, this is typically accomplished by incorporating either a vacuum or hydraulically operated boost piston assembly between the brake pedal and the master cylinder.

Vacuum operated boost piston assemblies utilize the pressure differences between the atmosphere and the vehicle's engine vacuum to develop a force across a boost piston or diaphragm. The force developed by this differential pressure across the boost piston may be many times that which could be developed by the operator by pressing against the pedal, and is applied to the piston of the master cylinder to actuate the brakes.

Hydraulic boost piton assemblies utilize a source of pressurized fluid developed by a hydraulic system, for example, using the vehicle's power steering pump, to apply a force to a boost piston or a plurality of boost pistons. The force applied by the hydraulic system to the boost piston, like the vacuum boost system, may be many times that which could be applied by the operator of the vehicle when operating the brake pedal through the same stroke length used to actuate the hydraulic boost piston assembly. Thus, the increased force applied to the piston of the master cylinder generates higher braking system operating pressures for a given pedal force input.

For some hydraulic boosters, undesirable boost piston travel length can occur when the fluid pressure source fails, such as in an engine stall in a brake circuit utilizing a power steering pump. Upon failure, the travel length of a boost piston and accordingly the brake pedal, may need to be advanced, during which there is generally not an increase in brake pressure generated by the master cylinder. This extraneous travel length is generally undesirable to the operator of the vehicle. Undesirable boost piston travel length can also occur after the demand for pressurized fluid flowing into the hydraulic booster rises above the maximum output of the source of pressurized fluid, referred to as booster runout. Thus, it would be desirable to provide a brake booster having a piston travel limit feature, to help prevent undesirable boost piston travel during booster runout and hydraulic system failures.

SUMMARY OF THE INVENTION

This invention relates to an improved brake booster adapted for use in a vehicle hydraulic brake circuit, in which the brake booster has piston travel limit features. The brake booster is in fluid communication with a source of pressurized fluid, such as a pump from a power steering system. The brake booster includes a housing having a bore formed therein. The brake booster further includes an input piston and an output piston which are slidably disposed within the bore of the housing. The bore, the input piston, and the output piston define a first chamber, wherein the volume of the first chamber is defined by the position of the input piston relative to the output piston. The input piston is operatively connected to a brake pedal. The output piston is operatively connected to a master cylinder. The housing has a first conduit formed therethrough which is in fluid communication with the first chamber and the source of pressurized fluid. Preferably, the output piston has a first diameter portion and a second diameter portion different from the first diameter portion. The bore, the first diameter portion, and the second diameter portion define a second fluid chamber which is also in fluid communication with the source of pressurized fluid.

The brake booster further includes a travel limit valve for selectively preventing fluid flow in a direction from the first chamber to the source of pressurized fluid via the first conduit. The travel limit valve can be actuated in relation to the direction of the motion of the first piston. The travel limit valve can be actuated by various methods, such as hydraulically, frictionally, or electronically. During movement of the input piston in a direction which applies an input force to the master cylinder, the travel limit valve is actuated to prevent fluid from exiting the first chamber, while allowing fluid to enter the first chamber. During movement of the input piston in a direction which releases an input force to the master cylinder, the travel limit valve is actuated to allow fluid to enter and exit the first chamber.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a graph plotting the relationship between the output pressure of a master cylinder and the travel length of a pedal for two curves representing a conventional brake booster not having travel limit features and a brake booster of the present invention having travel limit features.

DETAILED DESCRIPTION OF THE PREFERRED EMBODIMENT

Figure 1A:
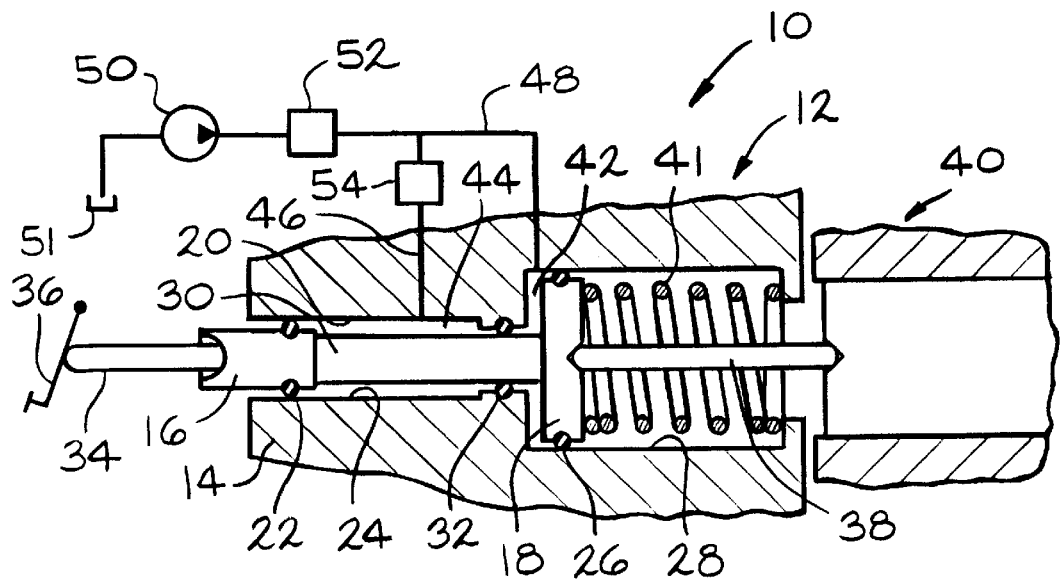
FIG. 1A is a schematic illustration of a first embodiment of a hydraulic brake circuit, in accordance with the present invention, wherein a brake booster of the brake circuit is shown in a non-actuated position.

In the following description of the invention, certain terminology will be used for the purpose of reference only, and are not intended to be limiting. Terms such as "upper", "lower", "above", "below", "rightward", "leftward", refer to directions in the drawings to which reference is made. Terms such as "inward" and "outward" refer to directions toward and away from, respectively, the geometric center of the component described. Terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Referring now to the drawings, there is illustrated schematically in FIG. 1A a hydraulic brake booster circuit, indicated generally at 10, in accordance with the present invention. The brake booster circuit 10 has piston travel limit features, as will be described in detail below. The circuit 10 includes a brake booster, indicated generally at 12, which is contained in a housing 14. The brake booster 12 includes an input piston 16 and an output piston 18 disposed within a multi-stepped bore 20. An elastomeric seal 22 is seated on the input piston 16 and engages a small diameter portion 24 of the bore 20 to provide a sealing engagement between the input piston 16 and the surface of the small diameter portion 24 of the bore 20. An elastomeric seal 26 is seated on the output piston 18 and engages a large diameter portion 28 of the bore 14 to provide a sealing engagement between the output piston 18 and the surface of the large diameter portion 28 of the bore 20. The output piston 18 has an axially extending stem 30 which contacts the input piston 16 when the brake booster 12 is in the position shown in FIG. 1A, hereinafter referred to as the "non-actuated position". The brake booster 12 further includes an elastomeric seal 32 seated within the bore 20 engaging the stem 30 of the output piston 18 to provide a sealing engagement between the surface of the bore 20 and the stem 30.

The brake booster 12 further includes an input rod 34 which operatively connects the input piston 16 to a brake pedal 36. An output rod 38 operatively connects the output piston 18 to a conventional master cylinder, partially shown at 40, which is in fluid communication with vehicle brakes (not shown) of a vehicle in which the circuit 10 has been installed. A return spring 41 biases the output piston 18 leftward, as viewing FIG. 1A. The brake booster 12 has two expandable hydraulic chambers: a boost chamber 42 and a pedal chamber 44. The boost chamber 42 is defined by the bore 20, the seals 26 and 32, and the output piston 18. The pedal chamber 44 is defined by the bore 20, the seals 22 and 26, the input piston 16, and the stem 30 of the output piston 18. Hydraulic fluid enters and exits the boost chamber 42 and the pedal chamber 44 via fluid conduits 46 and 48, respectively. The conduits 46 and 48 are in fluid communication with a source of pressurized fluid, such as a pump 50. The pump 50 may also, for example, supply a power steering system (not shown) for the vehicle in which the circuit 10 is installed. The pump 50 draws fluid from a fluid reservoir 51. A control valve 52 regulates the fluid pressure between the pump 50 and the boost and pedal chambers 42 and 44. Although FIG. 1A shows a single control valve 52, it is to be understood that multiple pressure control valves can be used to independently control the pressure in the conduits 46 and 48 leading to the boost chamber 42 and the pedal chamber 44, respectively. Also, it may be desirable to connect a single conduit to the pedal chamber 44 alone.

The circuit 10 further includes a travel limit valve, schematically represented at 54, in fluid communication between the control valve 52 and the pedal chamber 44. The travel limit valve 54 selectively prevents fluid flow in a direction from the pedal chamber 44 to the pump 50, to prevent fluid from exiting the pedal chamber 44, the reason for which will be explained below. The travel limit valve 54 can be a single valve, a plurality of valves, or other suitable valve arrangements for selectively preventing fluid from exiting the pedal chamber 44.

FIG. 1A illustrates the position of the input and output pistons 16 and 18 when the brake booster 12 is in a non-actuated position. During the non-actuated position, an input force is not exerted on the input rod 34 by the brake pedal 36, and the control valve 52 does not deliver pressurized hydraulic fluid to the brake booster 12. To operate the vehicle brakes and the brake booster 12 under normal braking conditions, the operator of the vehicle depresses on the brake pedal 36. Depression of the brake pedal 36 causes the input rod 34 to move the input piston 16 rightward as viewing FIG. 1A. A sensor mechanism (not shown) detects the travel of the input piston 16 and accordingly directs the control valve 52 to supply pressurized fluid through the conduits 46 and 48 into the boost and pedal chambers 42 and 44, respectively. The pressurized fluid entering the boost and pedal chambers 42 and 44 causes expansion thereof, thereby causing the output piston 18 to move rightward, as shown in FIG. 11B. The movement of the output piston 18 causes the output rod 38 to actuate the master cylinder 40. The brake booster 12, as illustrated in FIG. 1B, is said to be in an "actuated position".

Figure 1B:
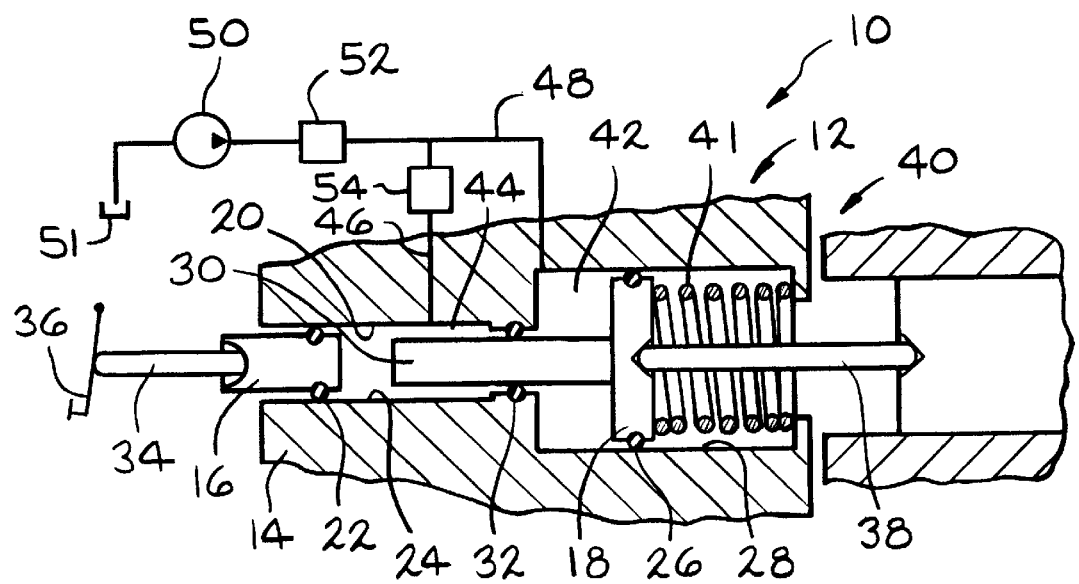
FIG. 1B is a schematic illustration of the brake circuit of FIG. 1A, wherein the brake booster is shown in an actuated position in which the input piston and the output piston are separated from each other.

As pressurized fluid enters the boost and pedal chambers 42 and 44 from the conduits 46 and 48, respectively, the input and output pistons 16 and 18 continue to move rightward, as viewing FIG. 1B. The output piston 18 travels away from the input piston 16 because of the expansion of the pedal chamber 44. The movement of the input and output pistons 16 and 18 will continue until the force generated by the pressure in the pedal chamber 44 balances the force on the input piston 16 from the input rod 34, and the force generated by the pressure in the boost chamber 34 balances the force from the master cylinder 33 and spring 27 on the piston 20.

FIG. 2 is a graph which plots the relationship between the pressure force from the master cylinder 40 (MC) and the travel length of the pedal 36. The travel length of the pedal 36 is proportional to the travel length of the input piston 16. The graph of FIG. 2 contains two graphical plots. The first plot, hereinafter referred to as the "non-travel limit plot", is represented by a broken line and relates to the properties of a master cylinder assisted by a brake booster, such as the brake booster 12 shown in FIGS. 1A through 1C, which does not have travel limiting features, such as the travel limit valve 54. The second plot, hereinafter referred to as the "travel limit plot", is represented by a solid line and relates to the properties of a master cylinder assisted by a brake booster having a travel limit valve 54, in accordance with the present invention.

Referring to the non-travel limit plot of FIG. 2, the pressure generated by the master cylinder 40 increases generally linearly with respect to the travel length of the brake pedal 36 until the master cylinder pressure has reached a pressure $P_1$ and the travel length of the brake pedal 36 generally reaches a position $T_1$, as indicated in the graph of FIG. 2. At the pressure level $P_1$, the fluid pressure from the pump 50 has reached its maximum pressure output and generally does not further supply an increase of pressurized fluid to the chambers 42 and 44. An increase in force exerted by the brake pedal 36 will advance the input piston 16 towards the stem 30 of the output piston 18, thereby pushing fluid out of the pedal chamber 44 and through the conduit 48. Therefore, an increase in pedal travel length will generally not result in an increase in pressure generated by the master cylinder 40 in a brake circuit not having a travel limit valve 54. This condition can occur in dual-piston brake boosters, such as the brake booster 12, and is referred to as a "booster runout condition", which is generally undesirable by the operator of the vehicle.

Figure 1C:
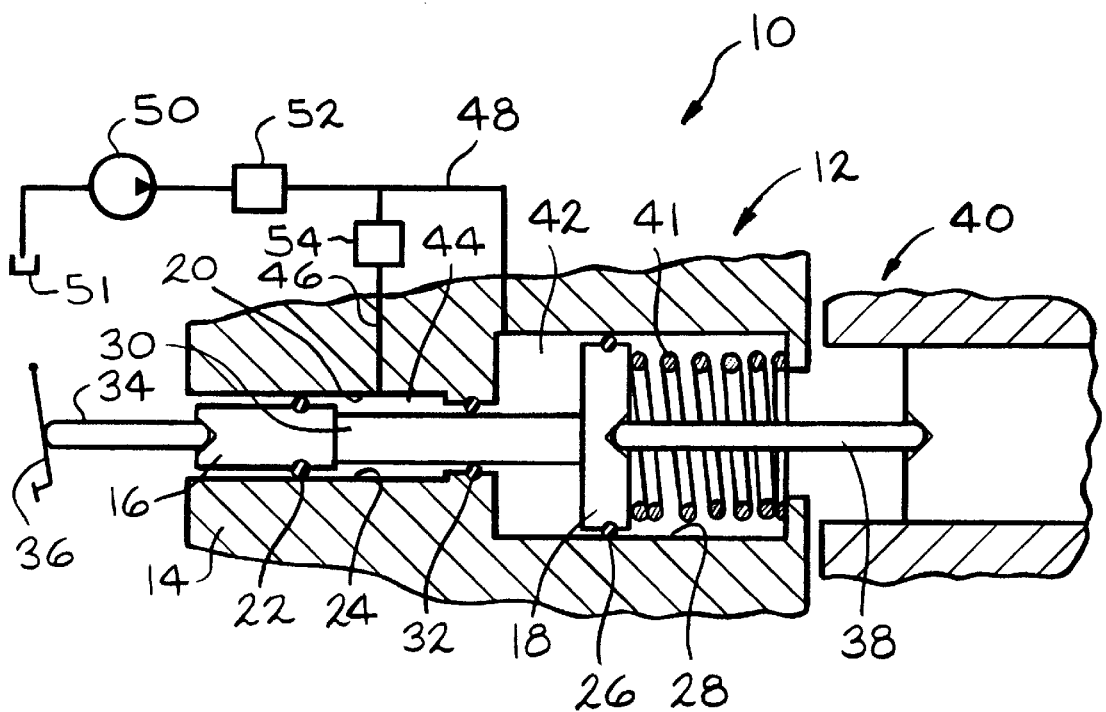
FIG. 1C is a schematic illustration of the brake circuit of FIG. 1A, wherein the brake booster is operating under a booster runout condition or a failed system condition in which the input piston and the output piston are in contact with each other.

During a booster runout condition, the input piston 16 will continue to move until it contacts the stem 30 of the output piston 18, as shown in FIG. 1C. This initial contact between the input piston 16 and the stem 30 of the output piston 18 occurs at a pedal travel position $T_2$, as indicated in FIG. 2. Further movement of the input piston 16 by the input rod 34 will cause the output piston 18 to move further rightward from the position shown in FIG. 1C, thereby increasing the master cylinder pressure. The pistons (not shown) in the master cylinder 40 will eventually bottom-out such that no further increase in pressure is sent to the brakes. Thus, during the pedal travel length $T_1$ to $T_2$, the driver is advancing the brake pedal 36, yet generally no increase in braking pressure from the master cylinder is generated.

Another undesirable pedal travel condition can exist in dual-piston brake boosters when the fluid pressure source fails, hereinafter referred to as "failed system condition", such as in an engine stall in a brake circuit 10 in which the pump 50 is a pump from a power steering system. Prior to a failed system condition, the input piston 16 and the output piston 18 can be separated from each other, as shown in FIG. 1B. When the failed system condition occurs in a brake circuit not having a travel limit valve 54, the volume of fluid in the boost and pedal chambers 42 and 44 is decreased, caused by the escaping fluid exiting through the conduits 46 and 48. If the input piston 16 and the output piston 18 were separated at the time of the failure, the input piston 16 and the output piston 18 will travel towards one another until contact is made between the input piston 16 and the stem 30 of the output piston 18. This movement of the input piston 16 and output piston 18 generally does not increase the master cylinder pressure. Braking force is then applied to the master cylinder 40 by the direct mechanical linkage of the brake pedal 36, the input rod 34, the input and output pistons 16 and 18, and the output rod 38. Generally, an increase in pedal force is required, because of the lack of boost pressure from the brake booster 11, for the same braking response as a non-failed system.

The brake boosters of the present invention include travel limit features, such as the travel limit valve 54, which reduce the amount of travel of the input piston 16 relative to the output piston 18 during booster runout and/or failed system conditions as described above. Broadly stated, the brake boosters of the present invention reduce the amount of piston travel by "locking" or "trapping" the pressure in the pedal chamber 44 when either the booster runout or the failed system condition occurs. For example, in the brake circuit 10, if the input piston 16 and the output piston 18 were in the position shown in FIG. 1B, and a booster runout or failed system condition were to occur, the travel limit valve 54 would be actuated to prevent fluid from exiting the pedal chamber 44. Further rightward movement of the input piston 16 would cause the output piston 18 to also move to the right because of the trapped fluid in the pedal chamber 44. This condition can be seen in the graph of FIG. 2 by the travel limit plot. If the brake booster 12 reaches a runout condition at the pressure level $P_1$ and position $T_1$, the travel limit valve 54 traps the fluid within the pedal chamber 44 and further movement of the brake pedal 36 continues to increase the output pressure from the master cylinder 40 until the master cylinder 40 bottoms out at a pressure level $P_2$. Note that the master cylinder 40 "bottoms out" with less pedal travel for the brake booster with the travel limit feature than the brake booster without a travel limit feature, because of the distance between the input piston 16 and the output piston 18 caused by the trapped volume of fluid.

Figure 3:
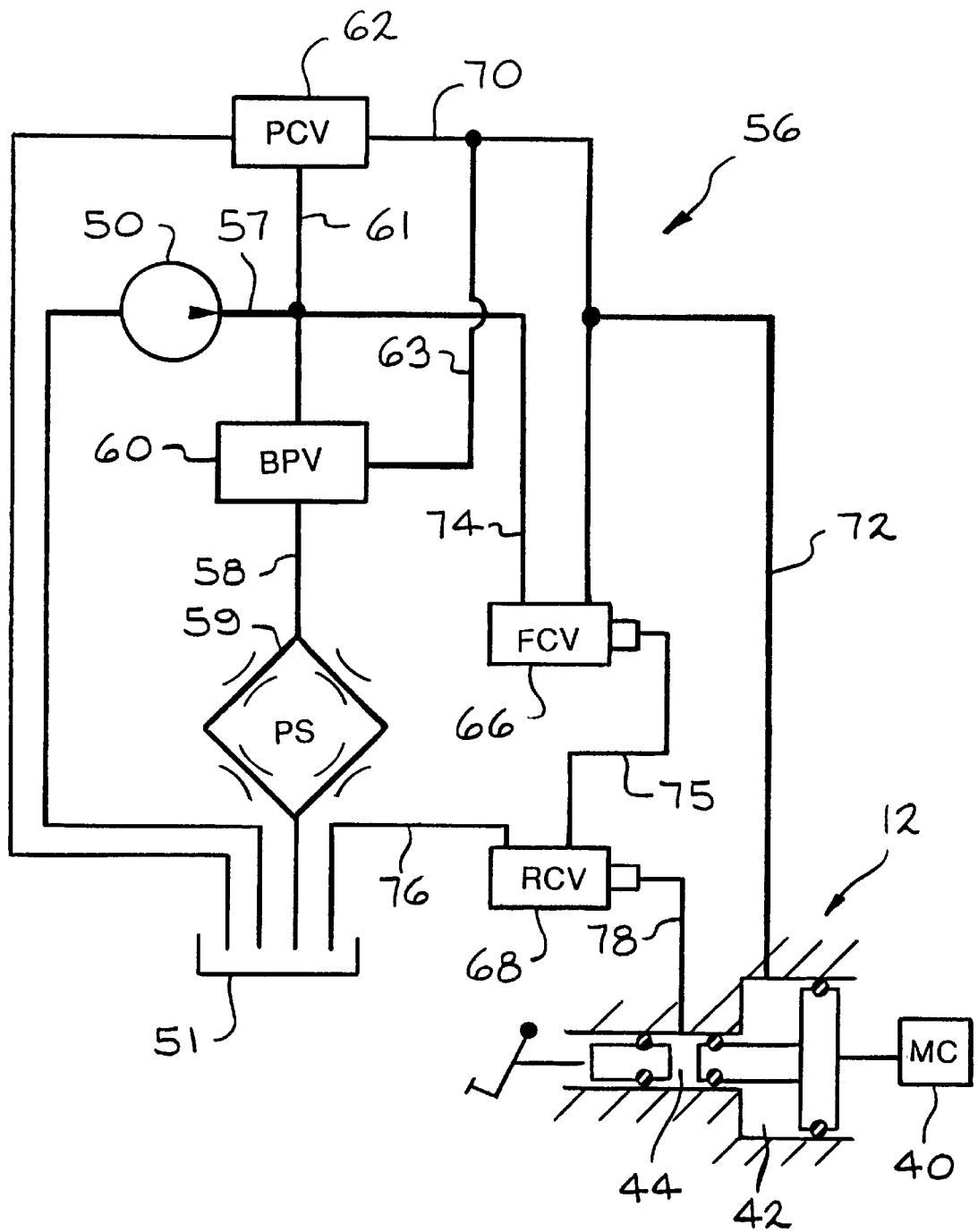
FIG. 3 is a block diagram of a second embodiment of a brake circuit having travel limit features.

There is schematically illustrated in FIG. 3 a second embodiment of a brake booster circuit, indicated generally at 56, having booster travel limit features in accordance with the invention. The circuit 56 has similar hydraulic components included in the brake circuit 10 of FIGS. 1A through 1C, and are labeled with similar reference numbers, such as the pump 50, the brake booster 12, the master cylinder 40, and the reservoir 51. The pump 50 pumps hydraulic fluid out of the reservoir 51 through a pump outlet conduit 57. A conduit 58 branches off from the conduit 57 and directs fluid to a group of conventional power steering valves 59. The fluid flowing through the conduit 58 passes through a back pressure valve 60. A conduit 61 taps into the conduit 57, permitting the flow of fluid from the outlet of the pump 50 to a pressure control valve 62. Another portion of the pressure control valve 62 is in fluid communication with the back pressure valve 60 via a conduit 63.

Figure 4:
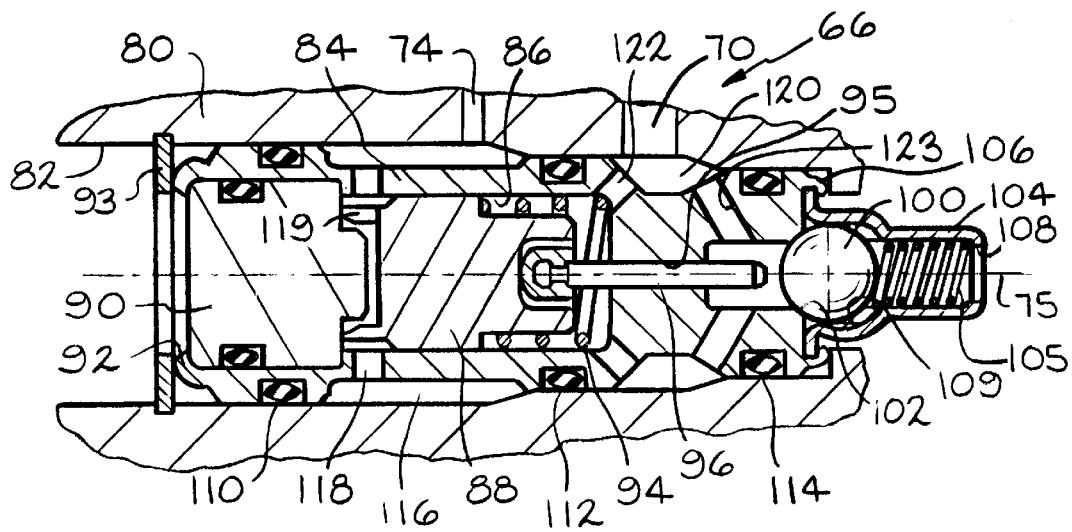
FIG. 4 is sectional view an embodiment of the failure control valve schematically shown in FIG. 3.
Figure 5:
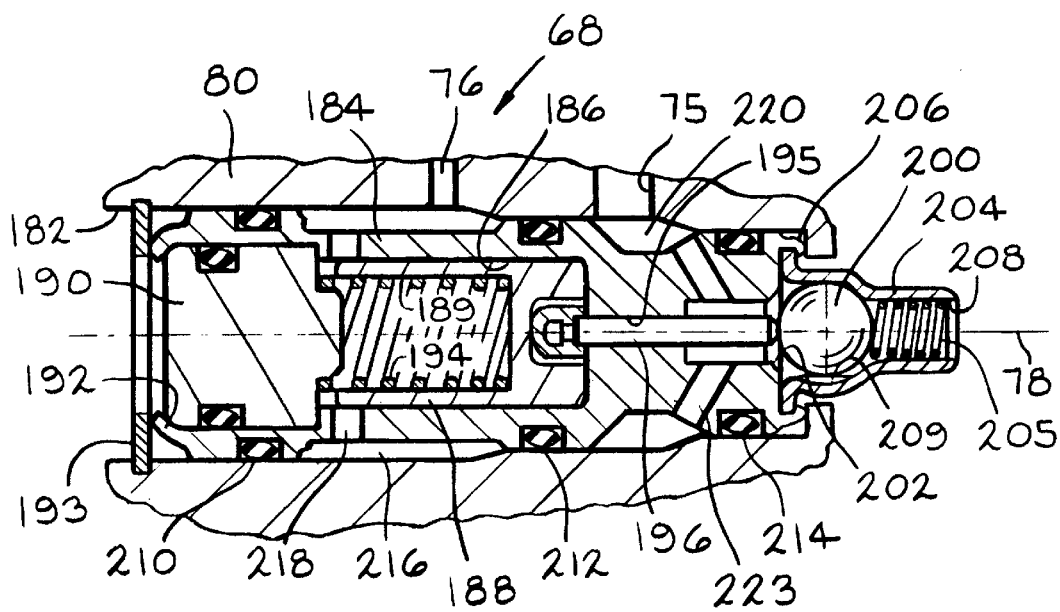
FIG. 5 is a sectional view of an embodiment of the runout control valve schematically shown in FIG. 3.

The circuit 60 further includes a normally closed failure control valve 66, an embodiment of which is shown in detail in FIG. 4, and a normally open runout control valve 68, an embodiment of which is shown in detail in FIG. 5. The operation of the failure control valve 66 and the runout control valve 68 will be discussed in detail below. The pressure control valve 62 is in fluid communication with a portion of the failure control valve 66 via a conduit 70. A conduit 72 which branches from the conduit 70 is in fluid communication with the boost chamber 42 of the brake booster 12. Another portion of the failure control valve 66 is in fluid communication with the conduit 57 via a conduit 74. Note that the pump 50, the pressure control valve 62, the failure control valve 66, and the back pressure valve 60 are all in fluid communication with each other via the conduits 57, 61, 74, and 58, respectively. As will be discussed in detail below, the normally closed failure control valve 66 will generally remain in an open position as long as a sufficient amount of pressure is created from the power steering valves 59 or the back pressure valve 60 through the conduits 57 and 58. The failure control valve 66 is also in fluid communication with the runout control valve 68 through a conduit 75. Another portion of the runout control valve 68 is in fluid communication with the reservoir 51 through a conduit 76. The runout control valve 68 also is in fluid communication with the pedal chamber 44 of the brake booster 12 through a conduit 78.

The pressure control valve 62 controls the amount of hydraulic pressure sent to the boost chamber 42 of the brake booster 12 via the conduit 72. The pressure control valve 62 also controls the amount of hydraulic pressure sent to the pedal chamber 44 via the conduit 70 through the failure control valve 66, the conduit 75, through the runout control valve 68, and the conduit 74. Broadly stated, the back pressure valve 60 maintains a required amount of fluid pressure supplied to the pressure control valve 62 whether or not the power steering valves 59 are building pressure in the fluid supplied by the pump 50. Therefore, the back pressure valve 60 generally assures that the pressure control valve 62 receives the required pressure level even when the power steering valves 59 and the associated power steering system (not shown) are not creating any back pressure.

As can be seen from FIG. 3, the back pressure valve 60 and the failure control valve 66 reference the inlet and outlet of the pressure control valve 62. The back pressure valve 60 generally maintains a selected differential pressure across the pressure control valve 62 (i.e., between conduits 61 and 70) at a pressure level greater than that required by the pressure control valve 62 to sufficiently operate the brake booster 12. If the back pressure valve 60 fails to maintain the selected differential pressure, the failure control valve 66 senses this failure and traps the fluid within the pedal chamber 44.

Under normal braking conditions, such as when there is not a booster runout condition or a failed system condition, pressurized fluid is free to flow from the conduit 70 through the failure and runout control valves 66 and 68 and into the pedal chamber 44 and the boost chamber 42 of the brake booster 12. During a failed system condition the failure control valve 66 prevents the fluid from flowing out of the pedal chamber 44, thereby trapping the fluid in the pedal chamber 44. During a booster runout condition the runout control valve 68 prevents the fluid from flowing out of the pedal chamber 44. Thus, the failure control valve 66 and the runout control valve 68 cooperate to function as the travel limit valve 54 of FIGS. 1A through 1C.

There is shown in FIG. 4, an embodiment of the failure control valve 66 housed in a valve body 80 and seated within a multi-stepped cylindrical housing bore 82. The failure control valve 66 includes a main body 84 having a central bore 86 therethrough. A plunger 88 is located within the central bore 86 and is retained by an end plug 90 which is held in place by a crimped edge 92 formed in an end of the main body 84. The main body 84 is retained in the housing bore 82 by a retaining ring 93. The plunger 88 is biased leftward, as viewing FIG. 4, by a spring 94 located within the central bore 86. The central bore 86 has a reduced diameter portion 95, having a pin 96 slidably disposed therethrough. One end of the pin 96 is in contact with the plunger 88. The failure control valve 66 further includes a ball 100 which cooperates with an annular ball seat 102 formed in an end of the main body 84. The ball 100 is retained in the failure control valve 66 by a retainer 104. The retainer 104 is secured to the main body 84 by a crimped edge 106 formed in an end of the main body 84. The ball 100 is biased leftward, as viewing FIG. 4, against the ball seat 102 by a spring 105. The retainer 104 has an opening 108 which communicates with the conduit 75 of the circuit 56 of FIG. 3. The retainer 104 also has a plurality of grooves 109 which allow fluid to flow around the ball 100 and the inner wall of the retainer 104. Of course, the inside diameter of the inner wall of the retainer 104 could be made slightly larger than the diameter of the ball 100 to allow the passage of fluid as well.

Seated about the main body 84 of the failure control valve 66 are three outer elastomeric seals 110, 112, and 114 which engage the wall of the housing bore 82. The seals 110 and 112 and the housing bore 82 cooperate to define a first chamber 116 which is in fluid communication with the central bore 86 through radial openings 118 formed through the wall of the main body 84. The first chamber 116 is in fluid communication with the conduit 74 of the circuit 56 of FIG. 3. Pressure from the fluid within the first chamber 116 biases the plunger 88 rightward, as viewing FIG. 4, against the spring 94. The left-hand end of the plunger 88 preferably has a plurality of slots 119 to assist in the fluid communication between the pressurized fluid and the left-hand end of the plunger 88, as shown in FIG. 4. A second chamber 120 is defined by the cooperation of the seals 112 and 114 and the housing bore 82. The second chamber 120 communicates with the central bore 86 through angularly extending openings 122 formed through the wall of the main body 84. The second chamber 120 is in fluid communication with the conduit 70 of the circuit 56 of FIG. 3. Pressure from the fluid within the second chamber 120 biases the plunger leftward, as viewing FIG. 4, assisting the spring 94. The second chamber 120 is in fluid communication with another portion of the central bore 86 through angularly extending openings 123 formed through the wall of the main body 84 adjacent the ball seat 102. Therefore, the fluid in the conduit 70 can flow into the conduit 75 when the ball 100 is lifted from the ball seat 102. The functionality of the failure control valve 66 will be described in greater detail below.

There is shown in FIG. 5, an embodiment of the normally open runout control valve 68, which is somewhat similar in structure to the failure control valve 66 of FIG. 4, and preferably includes components which can be used in both the runout control valve 68 and the failure control valve 66. The runout control valve 68 is preferably housed in the same valve body 80 and seated within a multi-stepped cylindrical housing bore 182. The runout control valve 68 includes a main body 184 having a central bore 186 therethrough. The main body 184 is retained in the housing bore 182 by a retaining ring 193. A plunger 188, which is structurally different than the plunger 88 of the failure control valve 66, is disposed within the central bore 186. The plunger 188 is retained by an end plug 190 which is held in place by a crimped edge 192 formed in an end of the main body 184.

The plunger 188 has a hollow portion 189 which houses a spring 194. The spring 194 biases the plunger 188 rightward, as shown in FIG. 5. The central bore 186 has a small diameter portion 195 having a pin 196 slidably disposed therethrough. One end of the pin 196 is in contact with the plunger 188. The runout control valve 68 further includes a ball 200 which cooperates with an annular ball seat 202 formed into an end of the main body 184. The ball 200 is retained in the runout control valve 68 by a retainer 204 which is held secured to the main body 184 by a crimped edge 206 formed in an end of the main body 184. The ball 200 is biased leftward, as viewing FIG. 5, by a spring 205. The runout control valve 68 is shown in a normally open position, wherein the plunger 188 is biased rightward by the spring 194 causing the pin 196 to normally lift the ball 200 from the ball seat 202. The retainer 204 has an opening 208 which is in fluid communication with the conduit 78. The retainer 204 also has a plurality of grooves 209 which allow the flow of fluid around the ball 200 and the inner wall of the retainer 204.

Seated about the main body 184 of the runout control valve 68 are three outer elastomeric seals 210, 212, and 214 which engage the wall of the housing bore 182. The seals 210 and 212 and the housing bore 182 cooperate to define a first chamber 216 which is in fluid communication with the central bore 186 through radial openings 218 formed through the wall of the main body 184. The first chamber 216 is in fluid communication with the reservoir 51 via the conduit 76 of the circuit 56 of FIG. 3. A second chamber 220 is defined by the cooperation of the seals 212 and 214 and the housing bore 80. The second chamber 220 is in fluid communication with the conduit 75 of the circuit 56 of FIG. 3. The second chamber 220 is in fluid communication with a portion of the central bore 186 through angularly extending openings 223 formed through the wall of the main body 184 adjacent the ball seat 202. Therefore, the fluid in the conduit 75 can flow into the conduit 78 when the ball 200 is lifted from the ball seat 202. Likewise, the fluid from the conduit 78 can flow around the ball 200 and through the ball seat 202 and into the conduit 75.

Referring to FIGS. 3 through 5, under normal brake boost conditions, the pump 50, with the assistance of the back pressure valve 60, supplies pressurized fluid to the pressure control valve 62 through the conduit 60. The pressure control valve 62 transmits pressure at a predetermined level through the conduit 70 to the second chamber 120 of the failure control valve 66. At the same time, a back pressure is created by a pressure differential across the back pressure valve 60 and the power steering valves 59, which pressurizes the fluid in the conduits 57, 61, and 74, which is referred to as the "reference pressure". The reference pressure will generally be greater than the pressure in the conduit 70 while the pump 50 is operating, due to the operation of the pressure control valve 62, the back pressure valve 60, and/or the power steering valves 59. The reference pressure from the conduit 74 is transmitted to the first chamber 116 of the failure control valve 66 which biases the plunger 88 rightward, from the position where the plunger 88 is shown in FIG. 4. The force of the spring 94 is selected so that the force from the reference pressure from the conduit 74 biasing the plunger 88 rightward is greater than the combined force of the spring 94 and the force generated by the pressure from the conduit 70 which biases the plunger 88 leftward. Therefore, the plunger 88 will be forced to the right causing the pin 96 to push against the ball 100, thereby lifting the ball 100 from the ball seat 102. Thus, under normal brake boost conditions, the normally closed failure control valve 66 is in an open position so that the pressure from the conduit 70 is transmitted through the failure control valve 66 and into the conduit 75.

The fluid from the conduit 75 passes through the normally open runout control valve 68 and flows into the conduit 78 and the pedal chamber 44, thereby actuating the brake booster 12. Note that increased pressure in the second chamber 220 will force the pin 196 and the plunger 188 leftward against the spring force from the spring 194. Pressurized fluid will be able to flow through the ball seat 202 and around the ball 200 against the force of the spring 205 much like a conventional ball check valve. When the pressure control valve 62 decreases the fluid pressure to relieve pressure from the pedal chamber 44 of the brake booster 12, the plunger 188 and the pin 196 will advance rightward and lift the ball 200 from the ball seat 202 to prevent the blockage of flow. The flow path then travels back to the pressure control valve 62 and to the reservoir 51. For reasons stated above, it is desirable to maintain or lock the fluid in the pedal chamber 44 of the brake booster 12 when the brake booster 12 is in the position shown in FIG. 1B. Under conditions when the fluid pressure source fails, such as in an engine stall, the pressure in the conduits 58 and 70 decreases. When this failed system condition occurs, the fluid from the pedal chamber 44 of the brake booster 12 is free to flow through the runout control valve 68 and into the conduit 75. However, the lack of pressure in the conduit 74 unbiases the plunger 88 of the failure control valve 66, causing the spring 94 to move the plunger 88 leftward, thus moving the pin 96 away from the ball 100. The spring 105 then pushes the ball 100 against the ball seat 102, thereby preventing fluid flow through the failure control valve 66. Thus, the fluid in the pedal chamber 44 is trapped, and undesirable pedal travel is reduced.

Under conditions in which the brake booster 12 initially experiences a booster runout condition, the pressure in the pedal chamber 44 of the brake booster 12 will be generally equal to the maximum pressure output of the pump 50. The force of the pressure in the conduit 75 is generally not enough to overcome the force of the spring 205 and the force of the pressure in the conduit 78. This results in the ball 200 remaining closed against the seat 202. When the brake booster 12 reaches the runout condition, there is a tendency for the fluid to flow from the conduit 78 through the runout control valve 68 because of increased pressure in the pedal chamber 44 which is a result of the driver indirectly pushing on the input piston 16 via the brake pedal, as shown in FIG. 1B. However, the cooperation of the ball 202 and the ball seat 202 prevents the flow of fluid in the direction from the conduit 78 to the conduit 75. The fluid within the pedal chamber 44 of the brake booster 12 will then be trapped during the duration of the booster runout condition.

Another method for selectively pressure locking the fluid within the pedal chamber 44 is to use the direction of the motion of the input piston 16 to toggle the travel limit valve 54 which prevents or permits the flow of fluid from entering or exiting the pedal chamber 44, as required. The travel limit valve 54 can be actuated by various methods, such as hydraulically, Frictionally, or electronically. Broadly stated, while the input piston 16 is moving in the direction to apply force to the master cylinder 40, fluid should be prevented from exiting the pedal chamber 44, yet allowed to enter the pedal chamber 44. When the input piston 16 is moving in the opposite direction releasing the force from the master cylinder 40, fluid should be allowed to enter and exit the pedal chamber 44.

Figure 6:
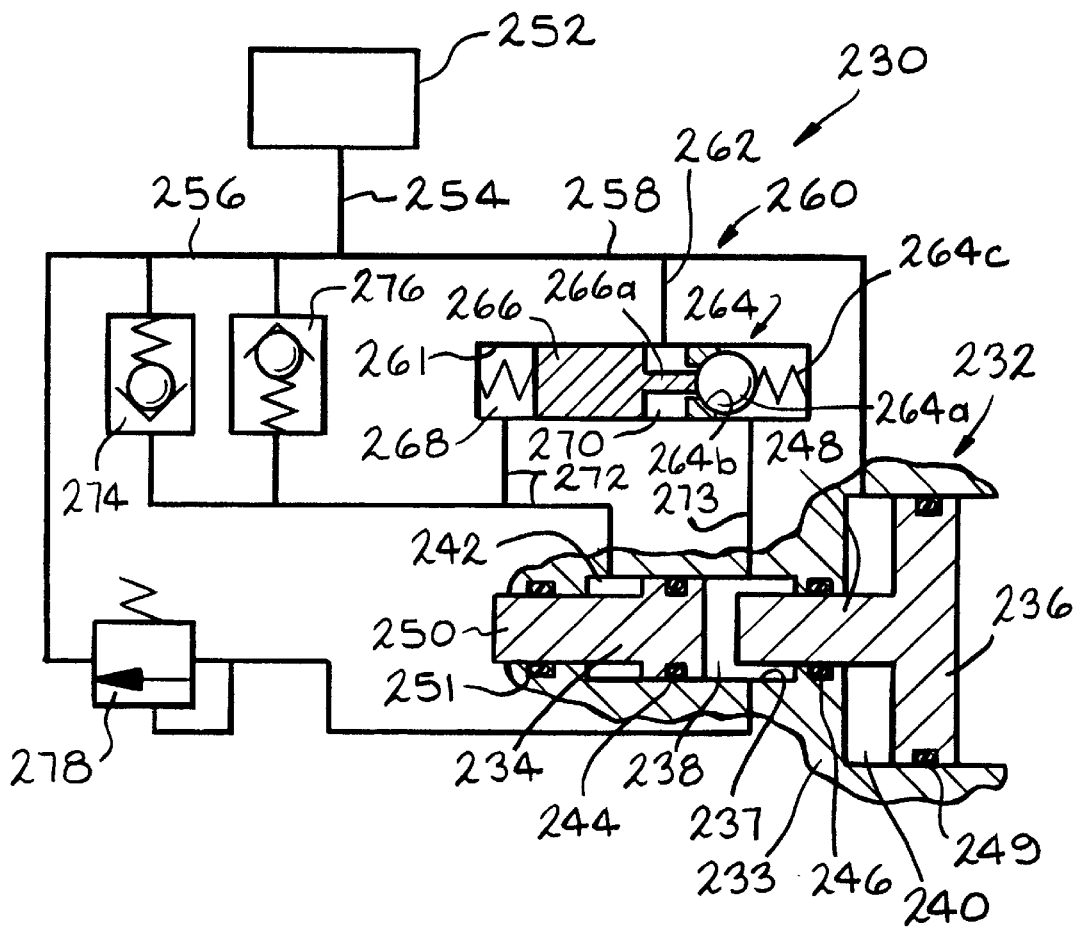
FIG. 6 is a block diagram of a third embodiment of a brake circuit having travel limit features.

There is schematically shown in FIG. 6, a third embodiment of a brake booster circuit, indicated generally at 230, in accordance with the invention. The circuit 230 includes a brake booster 232 contained in a housing 233. The brake booster 232 is similar to the brake booster 12 of FIG. 1A. The brake booster 232 includes an input piston 234 and an output piston 236 operatively connected to a master cylinder (not shown). The input piston 234 and the output piston 236 are disposed in a bore 237 formed in the housing 233. The brake booster 232 further includes three expandable chambers: a pedal chamber 238, a boost chamber 240, and an auxiliary chamber 242. The pedal chamber 238 is defined by the bore 237, the input piston 234, a seal 244 providing a sealing engagement between the input piston 234 and the wall of the bore 237, and a seal 246 providing a sealing engagement between a stem 248 of the output piston and the wall of the bore 237. The boost chamber 240 is defined by the bore 237, the output piston 236, the seal 246, and a seal 249 providing a sealing engagement between the output piston 236 and the wall of the bore 237. The auxiliary chamber 242 is defined by the bore 237, a reduced diameter portion 250 of the input piston 234, the seal 244, and a seal 251 providing a sealing engagement between the reduced diameter portion 250 of the input piston 234 and the wall of the bore 237.

The circuit 230 further includes a pressure source 252 in fluid communication with a conduit 254 which branches into conduits 256 and 258. The pressure source 252 can be any suitable source of pressurized fluid, such as a pump from a power steering system in cooperation with a control valve to regulate the pressure. The conduit 258 is in fluid communication with the boost chamber 240 of the brake booster 232. The circuit 230 further includes a toggle valve, indicated generally at 260. The toggle valve 260 includes a housing (not shown) having a bore 261 formed therein. A portion of the bore 261 of the toggle valve 260 is in fluid communication with the conduit 258 via a conduit 262. The toggle valve 260 includes a check valve, indicated generally at 264, and a piston 266 slidably disposed within the bore 261. The check valve 264 includes a ball 264a, a ball seat 264b, and a spring 264c which biases the ball 264a against the ball seat 264b. The piston 266 has a pin 266a extending therefrom in a direction towards the ball 264a. The pin 266a lifts the ball 264a from the ball seat 264b when the piston 266 has moved a sufficient distance rightward, as viewing FIG. 6. The toggle valve 260 further includes first and second chambers 268 and 270 defined by the bore 261 and the piston 266 which is positioned between the first and second chambers 268 and 270. The pressure of the fluid in the first chamber 268 acts upon the left-hand side of the piston 266, as viewing FIG. 6, and the pressure of the fluid in the second chamber 270 acts upon the right-hand side of the piston 266. The conduit 262 is in fluid communication with the second chamber 270. The first chamber 268 of the toggle valve 260 is in fluid communication with the auxiliary chamber 242 of the brake booster 232 via a conduit 272. A conduit 273 hydraulically connects the pedal chamber 238 with the right-hand side of the check valve 264, as viewing FIG. 6.

The circuit 230 further includes a pair of check valves 274 and 276 which are hydraulically connected in a parallel arrangement between the conduit 256 and the conduit 272. The check valve 274 permits fluid flow from the conduit 272 at a predetermined pressure to the conduit 256, but prevents the flow of fluid in the opposite direction. The check valve 276 permits fluid flow from the conduit 256 at a predetermined pressure to the conduit 272, but prevents the flow of fluid in the opposite direction. A high pressure relief valve 278 is hydraulically connected between the pressure source 252 and the pedal chamber 238. The relief valve 278 provides relief from exceedingly high pressures within the pedal chamber 238.

As the input piston 234 is urged rightward by driver input, as viewing FIG. 6, a mechanism (not shown) detects the movement of the input piston 234 and increases the pressure of the fluid from the pressure source 252. The pressurized fluid is transmitted from the pressure source 252 and flows through the conduits 254, 258, and 262, and into the second chamber 270 of the toggle valve 260. The pressure of the fluid from the pressure source 252 will generally be sufficient to open the check valve 264. Thus, the pressurized fluid will flow around the ball 264a, through the conduit 273, and into the pedal chamber 238. Pressurized fluid also flows from the pressure source 252, through the conduit 258, and into the boost chamber 240. If desired, the circuit 230 can be designed without the conduit 258 so that fluid only flows into the pedal chamber 238. Since the check valve 276 opens up at some predetermined pressure level, the first chamber 268 of the toggle valve 260, which is referenced to the pressure in the auxiliary chamber 242, will be lower than the pressure in the second chamber 270. The lower pressure in the first chamber 268 causes the higher pressure in the second chamber 270 to move the piston leftward, as viewing FIG. 6, thereby releasing any contact between the pin 266a and the ball 264a, seated the ball 264a against the ball seat 264b. Therefore, during forward movement of the input piston 234, the check valve 264 prevents fluid flow in a direction from the pedal chamber 238 through the check valve 264.

When the input piston 234 is released and moves leftward, as viewing FIG. 6, the pressure in the auxiliary chamber 242 of the brake booster 232 and the hydraulically connected first chamber 268 of the toggle valve 260 will be higher than the pressure from the pressure source 252 and the referenced second chamber 270 of the toggle valve 260. This pressure increase is due to a differential pressure created by the spring of the check valve 274. The result is a higher pressure in the first chamber 268 than the second chamber 270 which moves the piston 266 rightward, as viewing FIG. 6, thereby causing the pin 266a to lift the ball 264a from the ball seat 264b in the check valve 264. Therefore, during rearward movement of the input piston 234, the opened check valve 264 allows fluid flow to and from the pedal chamber 238. Thus, the toggle valve 260 and the check valves 274 and 276 cooperate to function as the travel limit valve 54 of FIGS. 1A through 1C.

Figure 7:
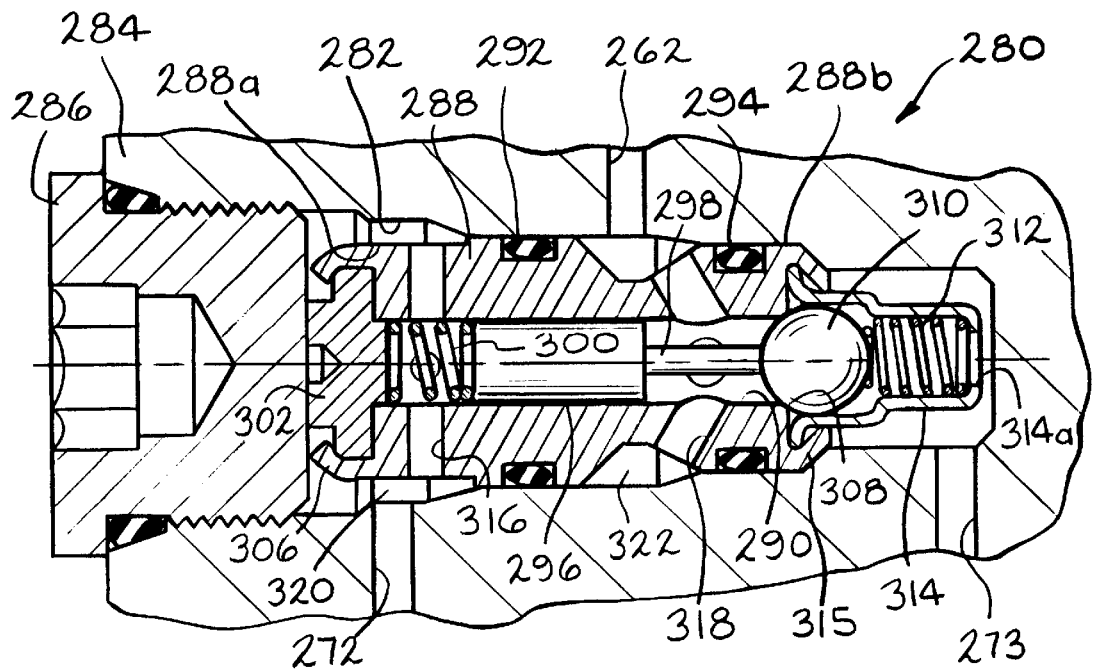
FIG. 7 is a sectional view of an alternate embodiment of the toggle valve, illustrated in FIG. 6.

FIG. 7 illustrates an alternate embodiment of a toggle valve, indicated generally at 280. The toggle valve 280 can be used as the toggle valve 260 in the brake circuit 230 illustrated in FIG. 6. The toggle valve 280 is housed within a bore 282 formed in a housing 284. The toggle valve 280 is retained in the bore 282 by a retaining plug 286 threadably fastened to the housing 282 at the end of the bore 282. The toggle valve 280 includes a body 288 having first and second ends 288a and 288b, respectively. The body 288 has a bore 290 formed therethrough. A pair of elastomeric seals 292 and 294 are seated about the outer surface of the toggle valve 280 and engage the wall of the bore 282 of the housing 284. A piston 296 is slidably disposed within the bore 290 of the body 288. The piston 296 has a pin 298 axially extending therefrom in a direction towards the second end 288b of the body 288. The piston 296 is biased rightward, as viewing FIG. 7, by a spring 300 housed within the bore 290 of the body 288. The spring 300 is retained in the bore 290 by a cap 302 fixably attached to the first end 288a of the body 288 by a crimped edge 306 formed about the first end 288a of the body 288. A ball seat 308 is formed in the second end 288b of the body 288 adjacent the opening of the bore 290. The toggle valve 280 further includes a ball 310 which is biased against the ball seat 308 by a spring 312. The spring 312 and the ball 308 are housed in an annular retainer 314 fixably attached to the second end 288b of the body 288 by a crimped edge 315 formed about the second end 288b of the body 288. The annular retainer 314 has an opening 314a formed therethrough. The first end 288a of the body 288 has a plurality of first transverse passageways 316 formed therethrough which extend radially outwardly from the bore 290 to the outer surface of the body 288. The second end 288b of the body 288 has a plurality of second transverse passageways 318 formed therethrough which generally extend radially outwardly from the bore 290 to the outer surface of the body 288.

The toggle valve 280 and the housing 284 cooperate to form first and second chambers 320 and 322, respectively. The first chamber 320 is generally defined by the bore 282 of the housing 284, the retaining plug 286, the seal 292, the first end 288a of the body 288, the first transverse passageways 316, the bore 290 of the body 288, and the left-hand end of the piston 296, as viewing FIG. 7. The second chamber 322 is generally defined by the bore 282 of the housing 284, the seals 292 and 294, the body 288, the second transverse passageways 318, and the right-hand end of the piston 296, as viewing FIG. 7. The pressure of the fluid within the first chamber 320 acts upon the left-hand end of the piston 296. The pressure of the fluid within the second chamber 322 acts upon the right-hand end of the piston 296.

The toggle valve 280 can be used as the toggle valve 260 in the brake circuit 230 illustrated in FIG. 6 and functions in a similar manner, as described in detail above. Thus, the first chamber 320 of the toggle valve 280 can be in fluid communication with the auxiliary chamber 242 of the brake booster 232 via the conduit 272, and the second chamber 322 can be in fluid communication with the pressure source 252 via the conduit 262.

Figure 8:
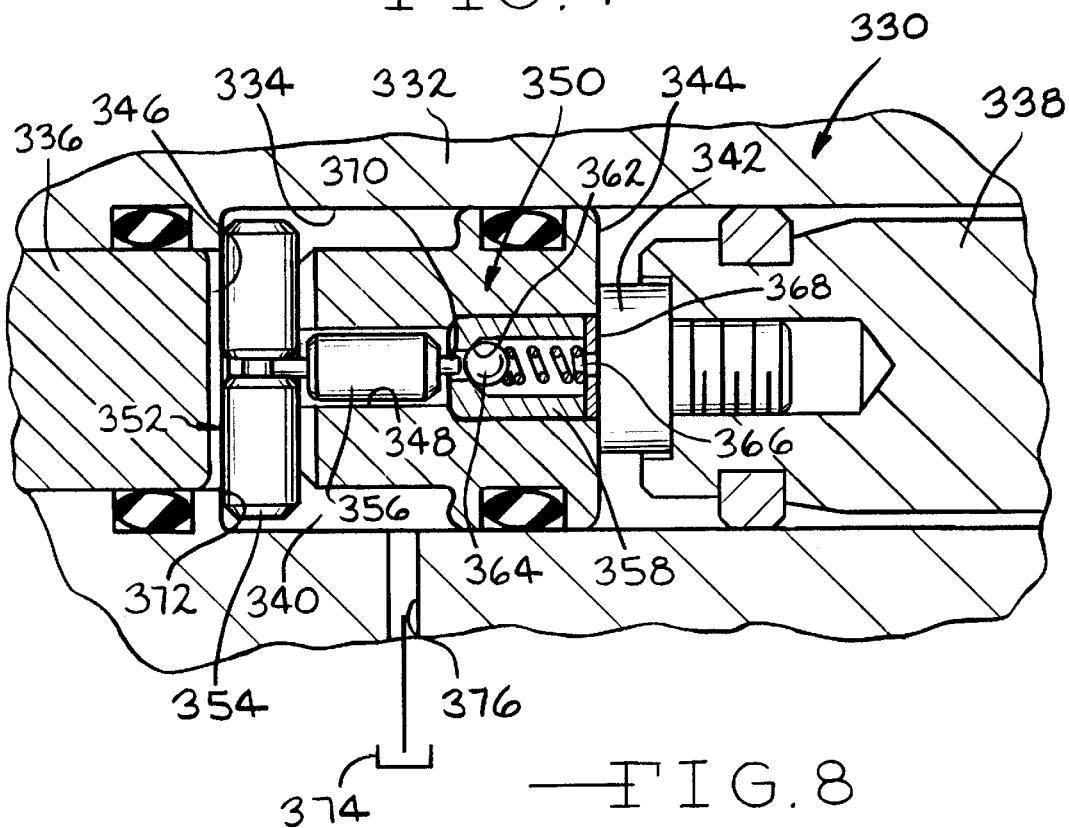
FIG. 8 is a sectional view of an alternate embodiment of a brake booster for use in the brake booster circuit of FIG. 6, in which the brake booster has an unloading valve.

There is shown in FIG. 8 a partial illustration of an alternate embodiment of a brake booster, indicated generally at 330, for use in the circuit 230 of FIG. 6. The brake booster 330 includes a housing 332 having a bore 334 formed therein. An input piston 336 and an output piston 338 are slidably disposed within the bore 334. The wall of the bore 334, the input piston 336, and the output piston 338 generally define a pedal chamber 340. The output piston 338 includes an axially adjustable threaded stop member 342 which contacts an end 344 of the input piston 336 when the brake booster 330 is in a non-actuated position. The end 344 of the input piston 336 has a transverse slot 346 formed therein. The input piston 336 also has an axial bore 348 formed through the end 344 which communicates with the transverse slot 346. The brake booster 330 further includes an unloading valve, indicated generally at 350, housed within the end 344 of the input piston 336. The function of the unloading valve 350 will be explained below.

The unloading valve 350 includes a T-shaped actuation rod 352 having an elongate first arm 354 and a second arm 356 extending perpendicular from the first arm 354. The first arm 354 is positioned within the transverse slot 346 of the input piston 336. For reasons which will be explained below, the axial length of the transverse slot 346 is longer than the width of the first arm 354, extending from left to right as viewing FIG. 7, so that the first arm 354 can move in a limited axial direction within the transverse slot 346. The second arm 356 is disposed within the axial bore 348 of the input piston 336. The unloading valve 350 further includes a hollow sleeve 358 having a bore 360 formed therethrough. The sleeve 358 is fixably retained in the axial bore 348 of the input piston 336, such as by a frictional fit. A ball seat 362 is formed at one end of the bore 360 of the sleeve 358. The unloading valve 350 further includes a ball 364 and a spring 366 which biases the ball 364 against the ball seat 362. The spring 366 can be retained in the sleeve 358 by any suitable structure, such as a retaining washer 368. The second arm 356 includes an axially extending pin 370 extending through the bore 360 of the sleeve 358 and positioned adjacent the ball 364.

The unloading valve 350 relieves pressure in the pedal chamber 340 when the input piston 336 is returned to its non-actuated position, thereby helping to assure that no pressure remains in the pedal chamber 340. During operation of the brake booster 330 when the input piston 336 is moving leftward, as viewing FIG. 8, to its non-actuated position, the input piston 336 will continue to move leftward until the first arm 354 of the actuation rod 352 contacts a shoulder 372 formed in the bore 334 of the housing 332. Further leftward movement of the input piston 336 causes the actuation rod 352 to move rightward with respect to the input piston 336 within the transverse slot 346 until the right-hand end of the first arm 354 contacts the right-hand wall of the transverse slot 346, as viewing FIG. 8. The movement of the actuation rod 352 causes the pin 370 to advance towards the ball 364 and lift the ball 364 from the ball seat 362, thereby opening the unloading valve 350. When the unloading valve 350 is open, fluid from the pedal chamber 340 can flow through the bore 360 of the sleeve 358 and the axial bore 348 of the input piston 336 to a reservoir 374 via a conduit 376 formed through the housing 332.

Figure 9:
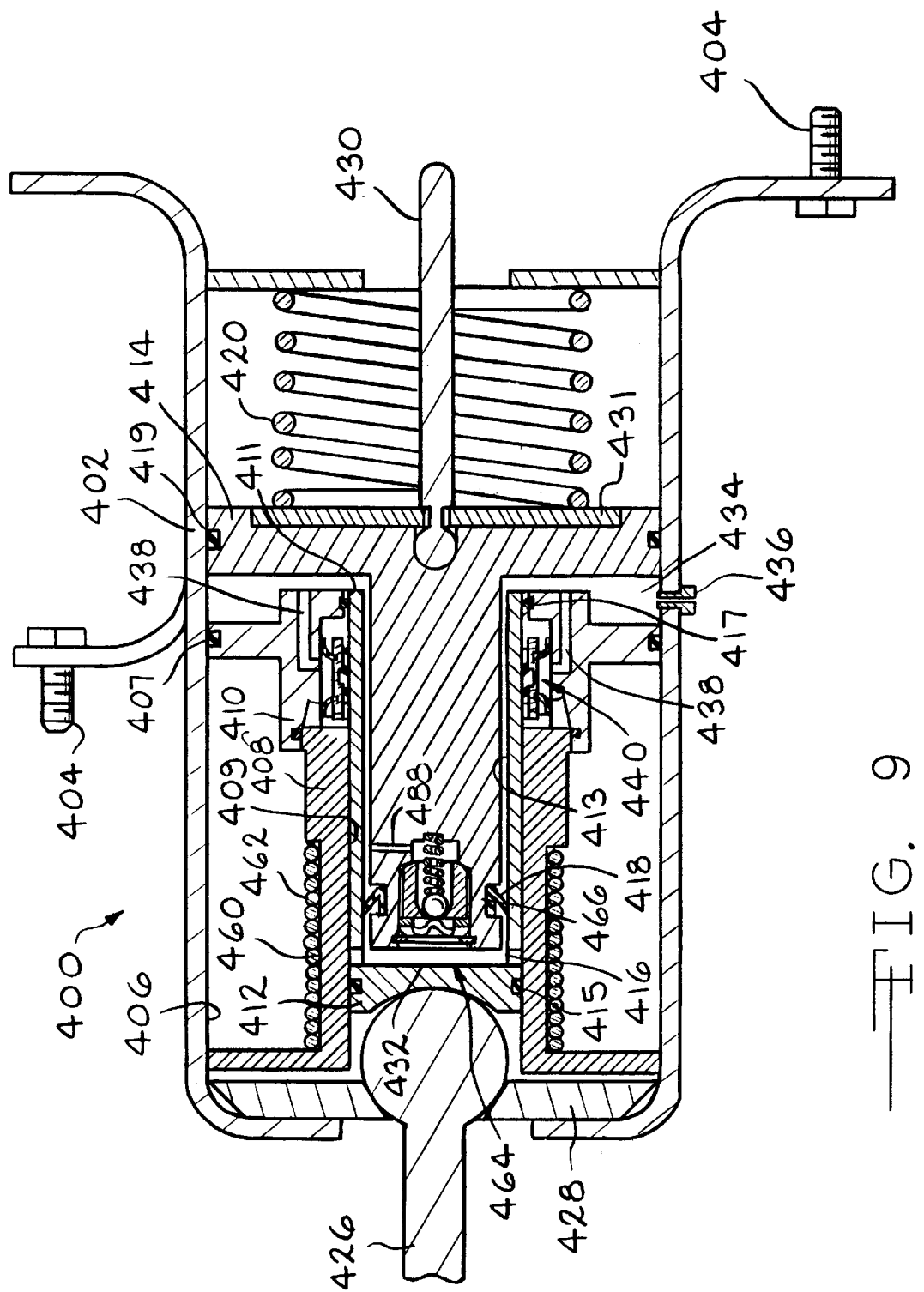
FIG. 9 is a sectional view of a fourth embodiment of a brake booster having a frictionally actuated seal assembly.

FIG. 9 is an illustration of a fourth embodiment of a brake booster, indicated generally at 400, which uses frictional means to pressure lock the fluid in a pedal chamber. The brake booster 400 includes a cylindrical housing shell 402 which is mounted to a vehicle (not shown) by a plurality of mounting bolts 404. The shell 402 has a generally cylindrical inner surface 406 defining a bore. The brake booster 400 further includes a sleeve 408 having a an axial hole 409 formed therethrough, and an annular collar 410 having an opening 411 formed therethrough. The sleeve 408 and the collar 410 are fixably attached to each other. Although illustrated as separate structures, the sleeve 408 and the collar 410 can be formed as a single part. The collar 410 sealingly engages the cylindrical surface 406 of the shell 402 by an elastomeric seal 407 fixably attached to the shell 402.

The brake booster 400 further includes a cup-shaped input piston 412 having an axial bore 413 formed therein. The input piston 412 is disposed within the hole 409 of the sleeve 408 and the opening 411 of the collar 410. The closed end of the input piston 412 is sealingly engaged with the surface of the hole 409 of the sleeve 408 by an elastomeric seal 415. The open end of the input piston 412 is sealingly engaged with the surface of the opening 411 of the collar 410 by an elastomeric seal 417. The brake booster 400 also includes an output piston 414 having an axially extending stem 416 disposed within the bore 413 of the input piston 412. Seated about the left-hand end of the stem 416, as viewing FIG. 9, is an elastomeric lip seal 418 which sealingly engages the bore 413 of the input piston 412. Seated about the large diameter portion of the output piston 414 is an elastomeric seal 419 which sealingly engages the inner cylindrical surface 406 of the shell 402. The output piston 414 is biased leftward as shown in FIG. 9 by a return spring 420.

The force input from a brake pedal (not shown) is transmitted to the brake booster 400 through an input rod 426. The end of the input rod 426 is retained within the brake booster 400 by a washer 428. The output piston 414 is operatively connected to a master cylinder (not shown) by an output rod 430 retained on the large diameter portion of the output piston 414 by a retainer ring 431.

The brake booster 400 has an expandable pedal chamber 432 generally defined by the lip seal 418, the end portion of the stem 416 of the output piston 414, the input piston 412, the seal 417, and the annular space adjacent the surface 409 on the sleeve 408. An expandable boost chamber 434 is defined by the lip seal 418, the inner cylindrical surface of the bore 413 of the input piston 412, the seal 417, the right-hand side of the collar 410, as viewing FIG. 9, the output piston 414, and the inner cylindrical surface 406 of the shell 402. A fluid port fixture 436 is threadably fastened to the shell 402 and is in fluid communication with the boost chamber 434. A pressure source (not shown), such as a pump, is in fluid communication with the fluid port fixture 436 to supply pressurized fluid to the pedal and boost chambers 432 and 434, as will be described in detail below. The collar 410 has a plurality of passageways 438 which hydraulically connects the boost chamber 434 to the pedal chamber 432. A ring-shaped seal assembly, indicated generally at 440, is slidably disposed within the collar 410. Generally, the seal assembly 440 controls the fluid communication between the pedal chamber 432 and the boost chamber 434.

Figure 10:
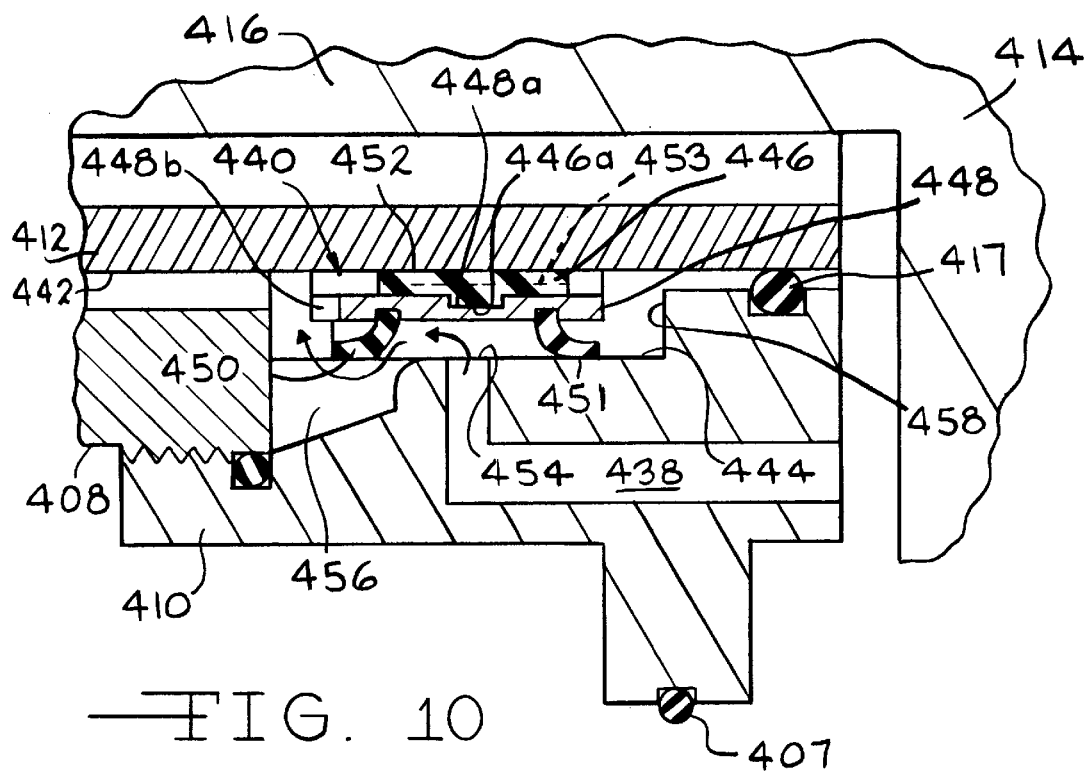
FIG. 10 is a sectional view of an enlarged portion of the brake booster of FIG. 9, illustrating a frictionally actuated seal assembly.

As shown in FIG. 10, the seal assembly 440 engages a cylindrical outer surface 442 of the input piston 412 and a cylindrical inner surface 444 of the collar 410. The seal assembly 440 includes an annular shaped friction ring 446, a tubular banding 448, and a pair of lip seals 450 and 451. The friction ring 446 has an inner surface 452 which engages the outer surface 442 of the input piston 412. Formed along the inner surface 452 of the friction ring 446 are a plurality of axially extending grooves 453 formed in the inner surface 452 of the friction ring 446. Preferably, the friction ring 446 is made of a suitable material, such as an elastomeric material, such that there exists a relatively high and consistent frictional force between the inner surface 452 of the friction ring 446 and the outer surface 442 of the input piston 412, the reason for which will be discussed below. The friction ring 446 can be secured to the banding 448 by any suitable means, such as by an adhesive or by integral cooperating structures. For example, as shown in FIGS. 9 and 10, the banding 448 has a circumferentially extending slot 448a which accepts a radially outwardly extending ridge 446a formed on the friction ring 446 to axially secure the friction ring 446 to the banding 448. The banding 448 further includes a plurality of notches 448b formed on an end of the banding 448 facing the sleeve 408. The notches 448b aid in allowing fluid to flow between the banding 448 and the sleeve 408 when the end of the banding 448 is positioned against the end of the sleeve 408.

The lip seals 450 and 451 of the seal assembly 440 are fixably attached to the banding 448 and engage the inner surface 444 of the collar 410. Preferably, the lip seals 450 and 451 are made of a material, such as an elastomeric material, having high sealing properties and low frictional properties. The passageways 438, which are formed in the collar 410, end in an opening 454 which is in fluid communication with the inner surface 444 of the collar 410 on the right-hand side of the lip seal 450, as viewing FIG. 10. The collar 410 also has a plurality of longitudinal slots 456 formed therein. The lip seal 450 cooperates with the slots 456 to control the fluid communication between the pedal chamber 432 and the boost chamber 434, as will be discussed in detail below.

Preferably, the brake booster 400 is equipped with a position sensor for sensing the axial position of the input piston 412 relative to the sleeve 408. For example, as shown in FIG. 9, the sleeve 408 has a longitudinal outer recess 460 containing a wire coil 462 therein. The sleeve 408 is preferably made of a non-metallic material, such as plastic or ceramic, and the input piston 412 is preferably made of a metallic material. The wire coil 462 acts as an inductive sensor which measures the axial position of the input piston 412 which is located within the magnetic field of the coil 462.

The brake booster 400 may also have an optional valve assembly 464, indicated generally at 466, housed within a bore 466 formed in the exposed end of the stem 416 of the output piston 414, as shown in FIG. 9. The structure and function of the valve assembly 464 will be explained in detail below.

In general, to accomplish pressure locking of the pedal chamber 432, a valve, such as the seal assembly 440, can be toggled by frictional methods so that as the input piston 412 moves in the rightward direction to apply a force to the master cylinder, fluid is prevented from exiting the pedal chamber 432, yet allowed to enter the pedal chamber 432. Also, when the input piston 412 is moving in the leftward direction, as viewing FIG. 9, releasing the force from the master cylinder, fluid is allowed to enter and exit the pedal chamber 432. Note that because of the structure of the lip seal 418, fluid can flow from the boost chamber 434 to the pedal chamber 432 by traveling around the perimeter of the lip seal 418. That is, the lip seal 418 can be deflected inwardly by fluid pressure acting on the right-hand outer curved portion to allow the fluid to flow around, while fluid pressure acting on the left-hand inner curved portion deflects the lip seal 418 outwardly against the inner surface 413 of the input piston 412, thereby creating a tighter seal. Also, fluid can flow from the boost chamber 434 to the pedal chamber 432 by traveling around the lip seals 450 and 451.

When braking is desired, the operator depresses the brake pedal (not shown) moving the input rod 426 against the input piston 412, thereby moving the input piston 412 rightward, as viewing FIGS. 9 and 10. As in the previous brake booster embodiments, preferably a mechanism (not shown) detects the movement of the input piston 412 by driver input and a pressure control valve (not shown) is directed to supply pressurized fluid through the fluid port fixture 436 and into the boost chamber 434. The fluid passes through the passageways 438 and around the lip seals 450 and 451. Fluid flowing around the lip seal 450 is directed through the slots 456, and into the pedal chamber 432. Fluid flowing around the lip seal 451 is directed through the grooves 453 formed on the inner surface 452, and into the pedal chamber 432. The pressurized fluid expands both the pedal and boost chambers 432 and 434 and causes the output piston 414 to move rightward, as viewing FIGS. 9 and 10. The output piston 414 pushes on the output rod 430 to actuate the master cylinder.

Initially, the seal assembly 440 moves jointly with the input piston 412 because of the frictional contact between the friction ring 446 and the outer surface 442 of the input piston 412. The seal assembly 440 will continue to travel a short distance with the input piston 412 in the rightward direction, as viewing FIGS. 9 and 10, until the seal assembly 440 contacts a shoulder 458 formed in the collar 410 and is, therefore, prevented from further rightward movement. At this position, the lip seal 450 of the seal assembly 440 is positioned so as to block fluid flowing from the slots 456 to the passageways 438 of the collar 410. Also, the lip seal 451 of the seal assembly 440 blocks fluid from flowing through the grooves 453 of the friction ring 446 into the passageways 438. However, fluid flow is only blocked in the direction from the pedal chamber 432 to the boost chamber 434, and not in the direction from the boost chamber 434 to the pedal chamber 412 because of the structure of the lip seal 450 itself. The input piston 412 is free to continue moving rightward as long as the force acting on the input piston 412 is greater than the frictional force between the outer surface 442 of the input piston 412 and the friction ring 446, the force at the spring 420, and the force from the master cylinder (not shown). The grooves 453 equalize the pressure on both sides of the seal assembly 440, and allow fluid, which is to the right of the lip seal 451 as shown in FIG. 10, to escape as the seal assembly 440 moves rightward. The equalization of the pressure also helps to ensure that a pressure build up will not cause movement of the seal assembly 440.

When the input piston 412 moves in the leftward direction as viewed in FIGS. 9 and 10, the seal assembly 440 moves jointly with the input piston 412 because of the frictional contact, until the seal assembly 440 contacts the sleeve 408 and is prevented from further movement. At this position, the lip seal 450 of the seal assembly 440 is positioned so as to allow fluid to flow from the slots 456 to the passageways 438.

Figure 11:
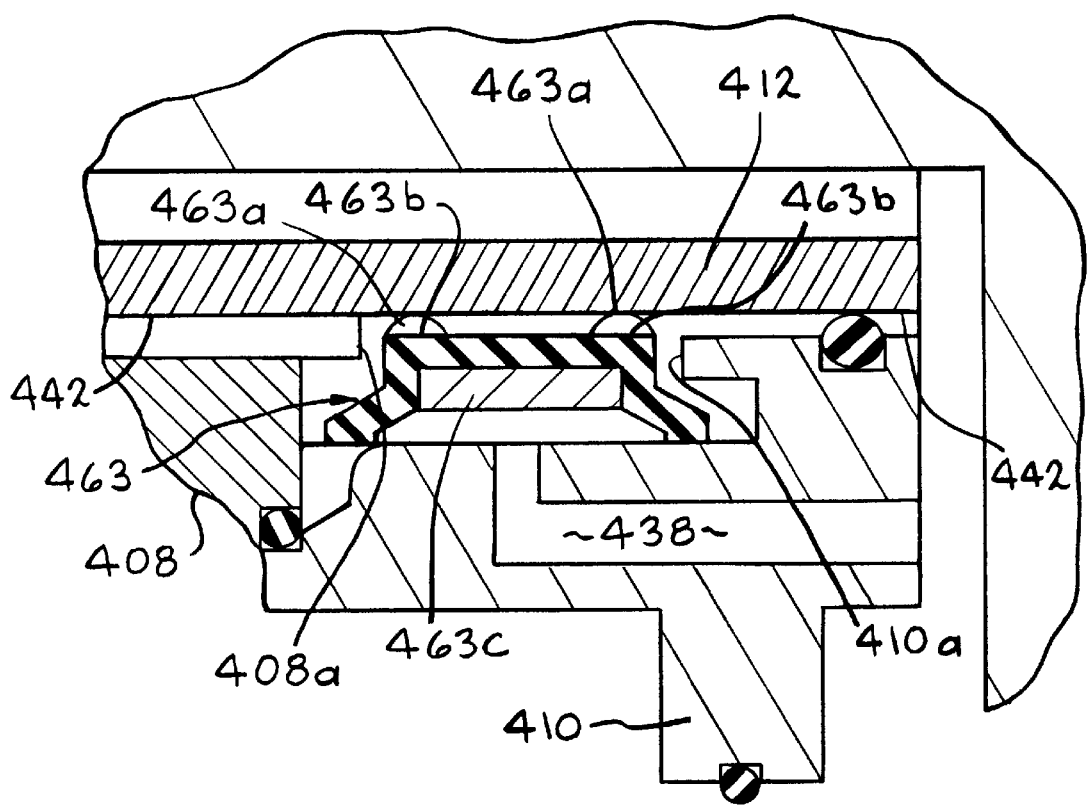
FIG. 11 is a sectional view of an enlarged portion of the brake booster of FIG. 9, illustrating an alternate embodiment of a friction ring.

Although the illustrated embodiment of the seal assembly 440 has four separate structures (i.e., the friction ring 446, the banding 448, and the lip seals 450 and 451), the seal assembly can be any suitable arrangement. For example, there is illustrated in FIG. 11 an alternate embodiment of a friction ring 463 formed of a continuous material in place of the separate friction ring 446 and the lip seals 450 and 451 of the seal assembly 440. Preferably, the friction ring 463 is made of a material, such as an elastomeric material, having high frictional and sealing properties. The friction ring 43 includes a pair of radially inwardly extending annular beads 463a which frictionally engage the outer surface 342 of the input piston 412. The annular beads 463a have axially extending slots 463b formed therethrough to permit the flow of fluid therethrough. If desired, a banding 463c could be formed integrally within the friction ring 463 as a molded insert. Preferably, the collar 410 has an axially extending stop 410a adjacent the right-hand end of the friction ring 463, as viewing FIG. 11, for abutment therewith when the friction ring 463 moves rightward relative to the collar 410.

Similarly, the sleeve 408 preferably has an axially extending stop 408a adjacent the left-hand end of the friction ring 463, as viewing FIG. 11, for abutment therewith when the friction ring 463 moves leftward relative to the sleeve 408.

Figure 12:
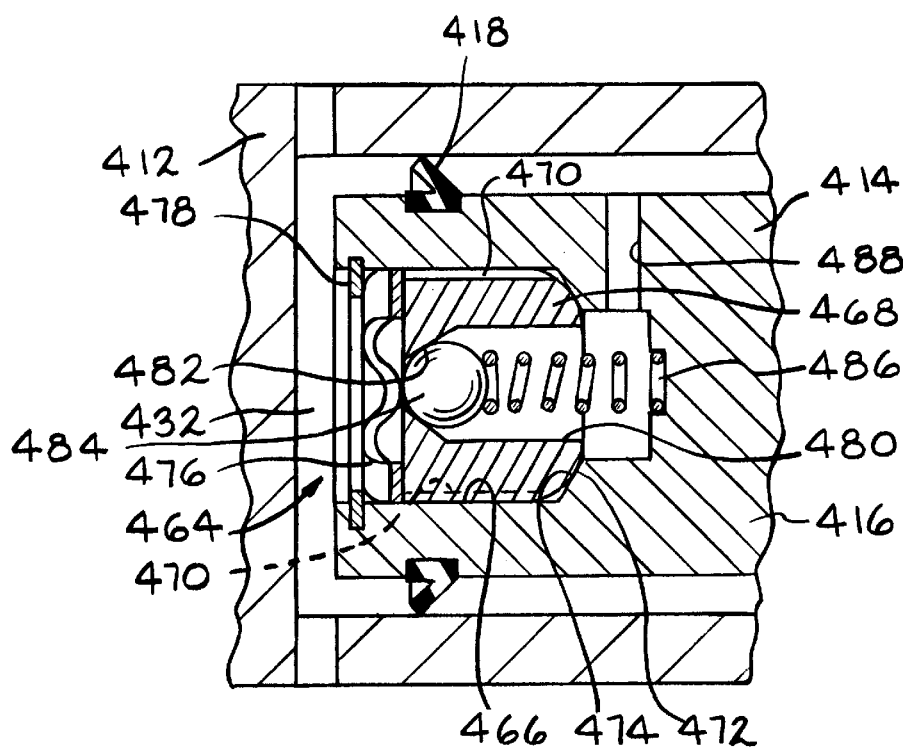
FIG. 12 is sectional view of an enlarged portion of the brake booster of FIG. 9, illustrating an optional valve assembly.

Preferably, the brake booster 400 includes the valve assembly 464. As best seen in FIG. 12, the valve assembly 464 includes a generally cylindrical sleeve 468 disposed within the bore 466 of the stem 416 of the output piston 414. The sleeve 468 has a plurality of axially extending grooves 470 formed in the outer surface of the sleeve 468. The sleeve 468 has an end 472 which cooperates with a seat 474 formed in the end of the stem 416 to provide a sealing engagement between the end 472 and the seal 474. The end 472 of the sleeve 468 is biased against the seat 474 by a spring, such as a wave spring 476, which acts on the left-hand side of the sleeve 468, as viewing FIG. 12. The wave spring 476 is retained within the bore 466 of the stem 416 by a snap ring 478. The sleeve 468 also has a through bore 480 formed therein. The sleeve 468 further includes a ball seat 482 formed at the end of the bore 480. The ball seat 482 cooperates with a ball 484 which is biased against the ball seat 482 by a spring 486.

As shown in FIGS. 9 and 12, the right-hand side of the valve assembly 464 communicates with the boost chamber 434 via a conduit 488. The left-hand side of the valve assembly 464 is in fluid communication with pedal chamber 432.

The valve assembly 464 generally provides for an additional fluid path from the boost chamber 434 to the pedal chamber 432. When the pressure in the boost chamber 434 reaches a sufficient pressure, the sleeve 468 will move leftward compressing the wave spring 476. The movement of the sleeve 468 causes the end 472 of the sleeve 468 to unseat itself from the seat 474, thereby allowing fluid from the boost chamber 434 to flow through the plurality of grooves 470 formed in the sleeve 468 and into the pedal chamber 432.

The valve assembly 464 also functions as a high pressure relief valve for relieving exceedingly high pressures from the pedal chamber 238. When the pressures in the pedal and the boost chambers 432 and 434 are approximately equal, the wave spring 476 biases the end 472 of the sleeve 468 against the seat 474, and the spring 486 biases the ball 484 against the ball seat 482. Therefore, the valve assembly 464 is closed so that fluid is prevented from flowing from the pedal chamber 432 to the boost chamber 434. The valve assembly 464 is designed so that fluid from the pedal chamber 432 is prevented from entering the boost chamber 434 under a failed system condition or a booster runout condition, as described in detail above. However, under conditions in which the pressure in the pedal chamber 238 are exceedingly high, the pressure in the pedal chamber 432 will lift the ball 484 from the ball seat 482, thereby allowing fluid to flow from the pedal chamber 432 to the boost chamber 434.

Although the spring force exerted by the wave spring 476 may be greater than the spring force exerted by the spring 486, the pressure required to lift the ball 484 from the ball seat 482 is generally higher than the pressure required to lift the end 472 of the sleeve 468 off of the seat 474. This is due to the effective sealing area or contact area between the ball 484 and the ball seat 482, and between the end 472 and the seat 474. Since the effective sealing area between the end 472 of the sleeve 468 and the seat 474 may be greater than the effective sealing area between the ball 484 and the ball seat 482, the pressure required to lift the ball 484 from the ball seat 482 is generally greater.

Figure 13:
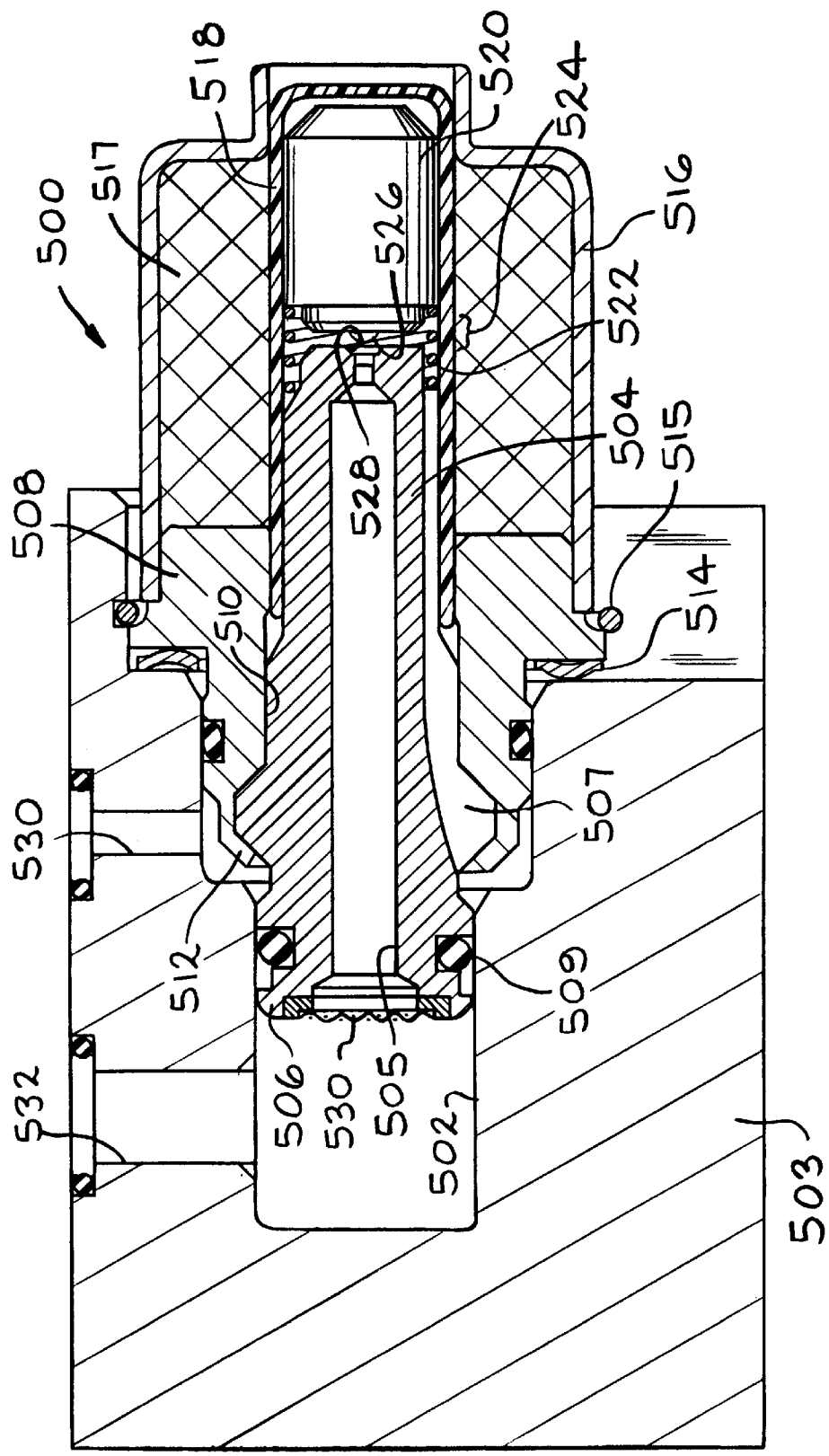
FIG. 13 is a sectional view of a solenoid valve which can be incorporated into a brake booster circuit to provide for travel limit features.

As stated above, a toggled valve arrangement providing for travel limit features for a brake booster circuit can be actuated electronically, such as by a solenoid valve, indicated generally at 500, as shown in FIG. 13. The solenoid valve 500 is housed within a multi-stepped cylindrical bore 502 formed in a valve body 503. The solenoid valve 500 includes a generally cylindrical plug 504 having a bore 505 formed therethrough. An end portion 506 of the plug 504 is disposed within the bore 502 of the valve body 503 and sealingly engages therewith by an elastomeric seal 509. The plug 504 has a plurality of radially extending grooves 507 formed on the outer surface of the plug 504, the reason for which will be explained below. The solenoid valve 500 further includes an annular sleeve 508 which sealingly engages a large diameter portion of the bore 502. The sleeve 508 includes a through bore 510 through which the plug 504 extends. The sleeve 508 is fastened to the plug by a crimped edge 512 formed on one end of the sleeve 508. The sleeve 508 is retained in the bore 502 by a spring washer 514 and a retainer ring 515.

The solenoid valve 500 further includes a shell 516 which is fastened to the sleeve 508 and extends outwardly from the sleeve 508 in a direction away from the valve body 503. The shell 516 houses a wire coil 517 wrapped around a generally cylindrical hollow isolation tube 518. The isolation tube 518 is fixably attached to the plug 504 and extends outwardly form the plug 504 in a direction away from the valve body 503. The isolation tube 518 is preferably made of a non-magnetic material. Slidably disposed within the isolation tube 518 is a generally cylindrical armature 520. The armature 520 is biased away from the plug 504 by a spring 522 so that a relatively small gap 524 exists between the facing end surfaces of the plug 504 and the armature 520. The armature 520 includes a semi-spherical valve tip 526 which cooperates with valve seat 528 formed on the end of the plug 504. The valve tip 526 can be formed from a ball press-fit into a bore formed in the end of the armature 520.

The valve body 503 has an inlet port 530 and an outlet port 532 which are in fluid communication with separate portions of the bore 502. When the solenoid valve 500 is in an open position, fluid is allowed to flow from the inlet port 530 to the outlet port 532. The fluid travels from the inlet port 530 into a portion of the bore 502 of the valve body 503, and passes through the grooves 507 formed on the outer surface of the plug 504. The fluid can then travel through the gap 524, through the bore 505 of the plug 504, through an optional filter 530, and out through the outlet port 532. When the solenoid valve 500 is actuated, an electromagnetic field is created by the coils 517 which forces the armature 520 to axially move in a leftward direction, when viewing FIG. 13. Continued movement of the armature 520 seats the valve tip 526 against the valve seat 528, thereby preventing fluid from flowing through the solenoid valve 500 between the inlet and the outlet ports 530 and 532.

The solenoid valve 500 can be used in cooperation with a brake circuit, such as the brake circuit 56 of FIG. 3 in place of the failure control valve 66 and the runout control valve 68. For example, the solenoid valve could be positioned between the pressure control valve 62 and the pedal chamber 44 of the brake booster 12. The inlet port 530 would be in fluid communication with the pressure control valve 62, and the outlet port 532 would be in fluid communication with the pedal chamber 44 of the brake booster 12. The solenoid valve 500 can then be actuated by a controller (not shown) as a result of a signal from a sensor (not shown) which senses movement of the input piston 16, thereby pressure locking the pedal chamber 44 during booster runout conditions or system failure conditions. The solenoid valve 500 can also be actuated by a signal from a control unit (not shown) which uses feedback from the pressure control valve 62, or from feedback from suitable pressure measurement readings.

Figure 14:
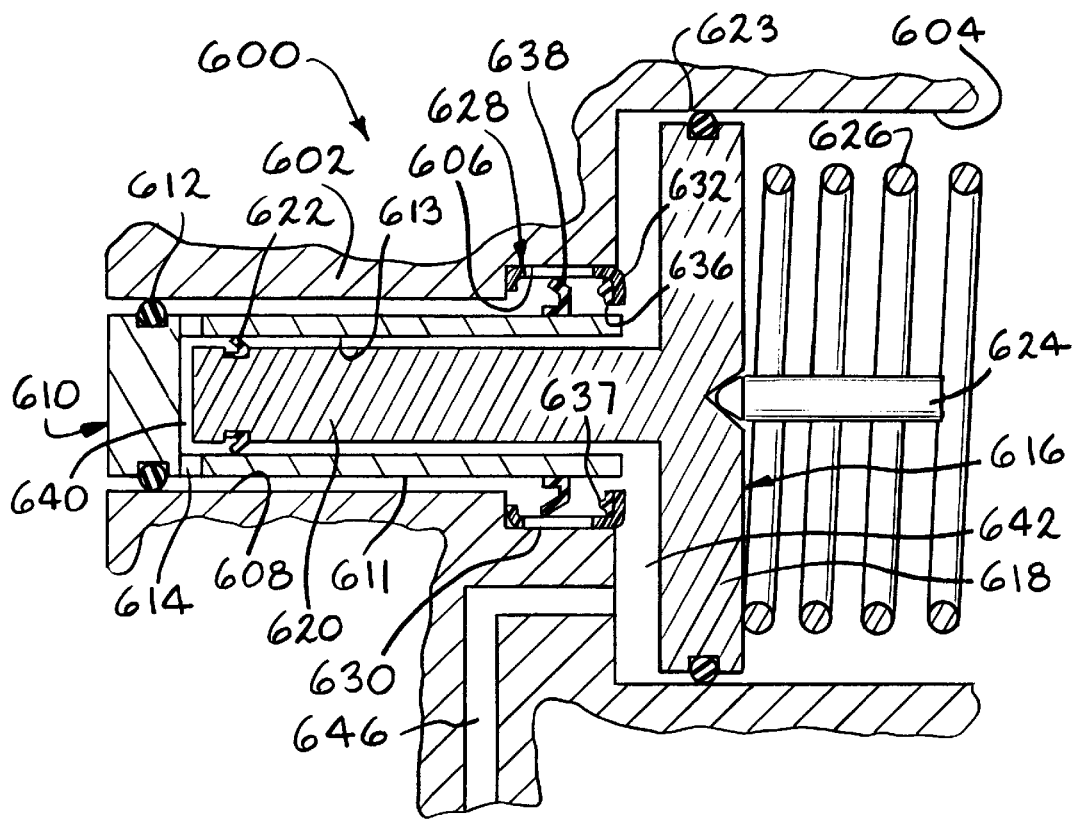
FIG. 14 is a sectional view of a fifth embodiment of a brake booster having a frictionally actuated seal assembly.

There is illustrated in FIG. 14 a fifth alternate embodiment of a brake booster, indicated generally at 600, which uses frictional means to pressure lock a pedal chamber. The brake booster 600 includes a housing 602 having three coaxial cylindrical bores formed therein: a large diameter bore 604, an intermediate diameter bore 606 and a small diameter bore 608. The brake booster 600 includes a cup-shaped input piston 610 having an outer cylindrical surface 611. The input piston 610 is slidably disposed within the small diameter bore 608 of the housing 602 and is sealingly engaged therewith by an elastomeric seal 612. The input piston 610 has an axial bore 613 formed therein. The input piston 610 further includes a plurality of radially extending passageways 614 formed through the side wall of the input piston 610 adjacent the left-hand end of the axial bore 613, as viewing FIG. 14. The booster 600 further includes an output piston 616 having a large diameter portion 618 and an axially extending stem 620. The stem 620 is slidably disposed within the axial bore 613 of the input piston 610. A lip seal 622 is seated about the left-hand end of the stem 620 and sealingly engages the cylindrical wall of the axial bore 613. The large diameter portion 618 of the output piston 616 sealingly engages the cylindrical wall of the large diameter bore 604 of the housing 602 by an elastomeric seal 623. The output piston 616 actuates a master cylinder (not shown) by an output rod 624. The output piston 616 is biased leftward, as viewing FIG. 14, by a return spring 626.

Figure 15:
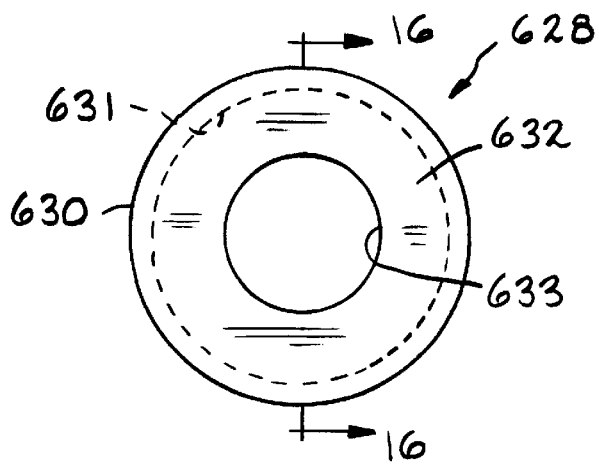
FIG. 15 is a front elevational view of the cage member illustrated in FIG. 14.
Figure 16:
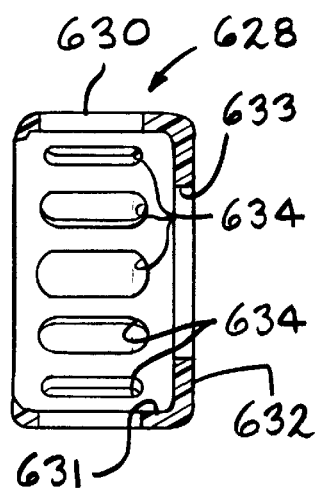
FIG. 16 is a sectional view of the cage member taken along lines 16—16 of FIG. 15.

Disposed within the intermediate diameter bore 606 of the housing 602 is an annular cage member 628. As shown in FIGS. 14 through 16, the cage member 628 has a cylindrical wall 630 having an inner cylindrical surface 631. The cage member 628 further includes a radially inwardly extending end wall 632 having an opening 633 formed therethrough. The cylindrical wall 630 has a plurality of longitudinally extending openings 634 formed therethrough, which are positioned circumferentially about the cage member 628.

An annular seal 636 is positioned adjacent the end wall 632 of the cage member 628, sealingly engaging the inner surface thereof. The annular seal 63 includes an annular nub 637 extending radially outwardly therefrom in a direction away from the end wall 632. A travel limit cup seal 638 is slidably disposed about the input piston 510 and sealingly engages the outer cylindrical surface 611 of the input piston 610 and the inner surface 631 of the cylindrical wall 630 of the cage member 628. As will be described in detail below, the travel limit cup seal 638 is movable relative to the input piston 610 and the cage member 628.

The brake booster 600 has an expandable pedal chamber 640 generally defined by the lip seal 622, the cylindrical wall of the axial bore 613 of the input piston 610, the travel limit cup seal 638, the cage member 628, an annular space between the outer surface 611 of the input piston 610 and the inner surface of the small diameter bore 608, the passageways 614 formed in the input piston 610, and the elastomeric seal 612. An expandable boost chamber 642 is defined by the elastomeric seal 623, a portion of the large diameter bore 604, an annular space between the axial bore 613 of the input piston 610 and the stem 620 of the output piston 616, the left-hand side of the large diameter portion 618 of the output piston 616, the cage member 628, and the travel limit cup seal 638. Note that the pedal chamber 640 and the boost chamber 642 are in fluid communication with each other via the openings 634 of the cage member 628 when the travel limit cup seal 638 is in the position as shown in FIG. 14. A pressure source (not shown) communicates with the boost chamber 642 via a passageway 646 formed in the housing 602.

Generally, to trap fluid within the pedal chamber 640, such as during a booster runout condition or a failed system condition, the travel limit cup seal 638 is toggled by frictional methods so that as the input piston 610 moves in an apply stroke direction, rightward as viewing FIG. 14, to apply force to the master cylinder, fluid is prevented from exiting the pedal chamber 640, yet fluid is allowed to enter the pedal chamber 640. Also, when the input piston 610 is moving in a return stroke direction, leftward as viewing FIG. 14, releasing the force from the master cylinder, fluid is allowed to enter and exit the pedal chamber 640. Note that because of the structure of the lip seal 622, fluid can flow from the boost chamber 642 to the pedal chamber 640 by traveling around the periphery of the lip seal 622, that is, the lip seal 622 can be deflected inwardly by fluid pressure acting on the right-hand side, as viewing FIG. 14, to allow the fluid to flow therearound, while fluid pressure acting on the left-hand inner curved portion deflects the lip seal 622 outwardly against the surface of the axial bore 613 of the input piston 610, thereby creating a tight seal. Also, fluid can flow from the boost chamber 642 to the pedal chamber 640 by traveling around the travel limit cup seal 638 in the same manner as described above with respect to the lip seal 622.

When braking is desired, the operator depresses the brake pedal (not shown) which acts against the left-hand end of the input piston 610, thereby moving the input piston 610 rightward, as viewing FIG. 14. As in the previous brake booster embodiments, preferably a mechanism (not shown) detects the movement of the input piston 610 by driver input and a pressure control valve (not shown) is directed to supply pressurized fluid through the passageway 646 and into the boost chamber 642. The fluid also enters the pedal chamber 640 via the openings 634 of the cage member 628 and around the lip seal 622. The input piston 610 and the output piston 616 will separate from each other because of the flow of pressurized fluid into the pedal chamber 640 and the boost chamber 642 causing expansion thereof. Since the pedal chamber 640 and the boost chamber 642 are in fluid communication with each other via the openings 634 formed in the cage member 628 when the input piston 610 initially moves in the apply direction (rightward), there is little or no pressure differential across the travel limit cup seal 638. Therefore, due to the frictional contact between the inner surface 631 of the travel limit cup seal 638 and the outer cylindrical surface 611 of the input piston 610, the travel limit cup seal 638 moves jointly with the input piston 610. Preferably, the coefficient of friction between the outer surface of the travel limit cup seal 638 and the inner surface 631 of the cage member 628 is less than the coefficient of friction between the inner surface of the travel limit cup seal 638 and the outer cylindrical surface 611 of the input piston 610. The travel limit cup seal 638 will continue to move jointly with the input piston 610 a relatively short distance until contact is made between the travel limit cup seal 638 and the annular nub 637 of the annular seal 636. After contact, the travel limit cup seal 638 and the annular seal 636 operate as a closed valve to prevent fluid from exiting the pedal chamber 640. With the pedal chamber 640 sealed off from exiting fluid, the apply stroke movement of the input piston 610 causes the pressure within the pedal chamber 640 to rise which can be higher than the pressure within the boost chamber 642. The rise in pressure causes a pressure differential across the travel limit cup seal 638. The pressure differential helps to maintain the travel limit cup seal 638 against the annular seal 636. Further increase in pressure from the pressure source will cause fluid to enter the pedal chamber 640 around the lip seal 622. Therefore, fluid can enter the pedal chamber 640 during the apply stroke of the input piston 610, but is prevented from exiting the pedal chamber 640 when the travel limit cup seal 638 is engaged with the annular seal 636.

On the return stroke of the input piston 610, leftward as viewing FIG. 14, the volume of the pedal chamber 640 increases due to the movement of the input piston 610 in a direction away from the stem 620 of the output piston 616. The increase in volume of the pedal chamber 640 generally causes a decrease in the pressure of the pedal chamber 640 relative to the pressure in the boost chamber 642, thereby creating a pressure differential across the travel limit cup seal 638. The pressure differential and the friction between the inner surface of the travel limit cup seal 638 and the outer cylindrical surface 611 of the input piston 610 cause the travel limit cup seal 638 to separate from the annular seal 636 and move with the input piston 610. Upon separation of the annular seal 636 and the travel limit cup seal 638, fluid is allowed to enter or exit the pedal chamber 640 via the openings 634 of the cage member 628 during the return stroke of the input piston 610.

Figure 17:
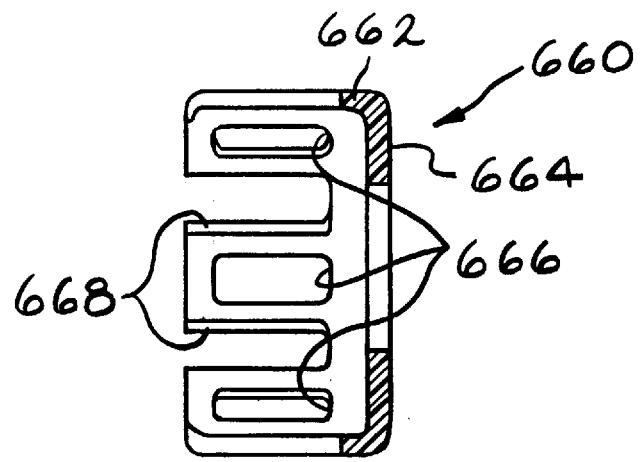
FIG. 17 is a sectional view of an alternate embodiment of a cage member.

There is shown in FIG. 17 an alternate embodiment of a cage member, indicated generally at 660. The cage member 660 has a cylindrical wall 662 and a radially extending end wall 664. The cage member 660 has alternating longitudinally extending openings 666 and slots 668 formed in the cylindrical wall 662. The slots 668 extend through the left-hand end of the cylindrical wall 662. The slots 668 help prevent the travel limit cup seal 636 from sealing against the left-hand end of the cage member 660 when the input piston 610 is moving in the return stroke direction so that fluid can flow through the slots 668 between the pedal chamber 640 and the boost chamber 642.

Figure 18:
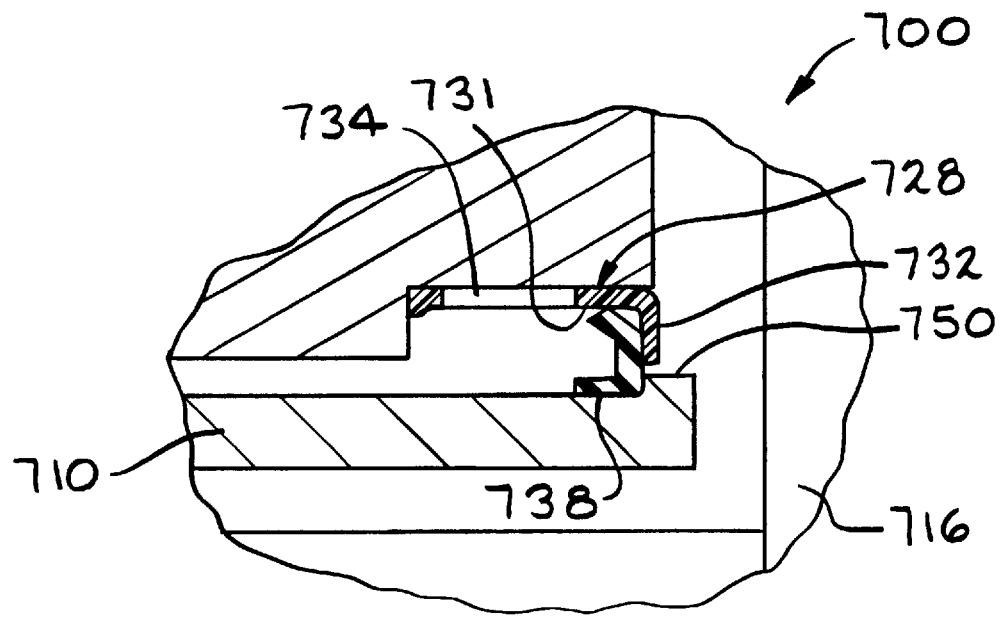
FIG. 18 is a partial sectional view of an alternate embodiment of the brake booster illustrated in FIG. 14.

There is shown in FIG. 18 an alternate embodiment of a brake booster 700, similar to the brake booster 600, in which the annular seal 636 is not included. The brake booster 700 operates in a similar manner as described above with respect to the brake booster 600, with an exception that the right-hand end of a travel limit cup seal 738, as viewing FIG. 18, can seal directly against a radially extending end wall 732 of a cage member 728. The outer surface of the travel limit cup seal 738 can also directly seal against an inner surface 731 of the cage member 738 at a portion where the openings 734 do not extend.

As shown in FIG. 18, an input piston 710 can be formed with an optional shoulder 750 extending radially outwardly from the open end of the input piston 710. The shoulder 750 helps to push against the travel limit cup seal 738 when the input piston 710 is moving in the return stroke, leftward as viewing FIG. 18. Of course, a shoulder can also be formed on the input piston 610 of the brake booster 600, illustrated in FIG. 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A brake booster in fluid communication with a source of pressurized fluid, said brake booster comprising:

a housing having a bore formed therein, said housing having a conduit formed therein being in fluid communication with said bore and a source of pressurized fluid;

first and second pistons slidably disposed within said bore, said bore, said first piston, and said second piston defining a first fluid chamber being in fluid communication with said conduit, wherein the volume of said first fluid chamber is defined by the position of said first piston relative to said second piston, said second piston having a first diameter portion and a second diameter portion different from said first diameter portion, said bore, said first diameter portion, and said second diameter portion defining a second fluid chamber in fluid communication with the source of pressurized fluid; and a valve selectively preventing fluid flow in a direction from said first fluid chamber to the source of pressurized fluid via said conduit.

2. The brake booster of claim 1, wherein said first piston is moveable in a first direction and a second direction opposite said first direction, said valve preventing the flow of fluid from exiting said first fluid chamber via said conduit when said first piston travels in said first direction, said valve allowing the flow of fluid to enter and exit said first fluid chamber via said conduit when said first piston travels in said second direction.

3. The brake circuit of claim 1, wherein said first piston is moveable in a first direction and a second direction opposite said first direction, said valve preventing the flow of fluid from exiting said first fluid chamber via said conduit when said first piston travels in said first direction, said valve allowing the flow of fluid to enter and exit said first fluid chamber via said conduit when said first piston travels in said second direction.

4. A brake circuit comprising:
   a brake booster including:
      a housing having a bore formed therein;
      a first piston slidably disposed within said bore; and
      a second piston slidably disposed within said bore, said bore and said first and second pistons defining a first fluid chamber, wherein the volume of said chamber is defined by the position of said first piston relative to said second piston, said second piston having a first diameter portion and a second diameter portion different from said first diameter portion said bore, said first diameter portion, and said second diameter portion defining a second fluid chamber in fluid communication with the source of pressurized fluid;
   a master cylinder operatively connected to said second piston;
   a source of hydraulic pressure being in fluid communication with said first fluid chamber;
   a control valve for regulating the fluid pressure between said source and said first fluid chamber; and
   a valve for selectively preventing fluid flow in a direction from said first fluid chamber to said source of pressurized fluid.

5. The brake circuit of claim 4, wherein said first piston is moveable in a first direction and a second direction opposite said first direction, said valve preventing the flow of fluid from exiting said first fluid chamber via said conduit when said first piston travels in said first direction, said valve allowing the flow of fluid to enter and exit said first fluid chamber via said conduit when said first piston travels in said second direction.

6. A brake booster in fluid communication with a source of pressurized fluid, said brake booster comprising:
   a housing having a bore formed therein, said housing having a conduit formed therein being in fluid communication with said bore and a source of pressurized fluid;
   first and second pistons slidably disposed within said bore, said bore, said first piston, and said second piston defining a fluid chamber being in fluid communication with said conduit, wherein the volume of said fluid chamber is defined by the position of said first piston relative to said second piston; and
   a valve selectively preventing fluid flow in a direction from said fluid chamber to the source of pressurized fluid via said conduit, wherein said valve includes a seal assembly frictionally engaged with one of said first and second pistons for movement therewith.

7. The brake booster of claim 6, wherein said seal assembly includes:
   a tubular cage member disposed within said bore, said cage member having an axially extending opening formed therethrough; and
   a seal slidably disposed within said cage member and frictionally engaged with said first piston, said seal movable between a first position and a second position relative to said cage member, wherein said seal prevents the flow of fluid from exiting said chamber via said opening when said seal is in said first position, said seal allowing the flow of fluid to enter and exit said first chamber via said opening when said seal is in said second position.

8. The brake booster of claim 7, wherein said cage member has a plurality of openings formed therethrough.

9. The brake booster of claim 7, wherein said seal assembly includes a second seal disposed within said cage member, said second seal being sealingly engaged with said first seal when said seal is in said first position.

10. The brake booster of claim 7, wherein said seal assembly includes a second seal disposed within said cage member, said second seal being sealingly engaged with a radially extending end wall formed in said cage member when said seal is in said first position.

\* \* \* \* \*